United States Patent
Suzuki et al.

(10) Patent No.: US 12,182,904 B2
(45) Date of Patent: Dec. 31, 2024

(54) INFORMATION PROCESSING DEVICE AND INFORMATION PROCESSING METHOD

(71) Applicant: SONY GROUP CORPORATION, Tokyo (JP)

(72) Inventors: Aya Suzuki, Tokyo (JP); Katsuji Miyazawa, Tokyo (JP); Eiji Shintani, Tokyo (JP); Hiromu Yumiba, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/627,774

(22) PCT Filed: Jul. 10, 2020

(86) PCT No.: PCT/JP2020/026957
§ 371 (c)(1),
(2) Date: Jan. 17, 2022

(87) PCT Pub. No.: WO2021/014993
PCT Pub. Date: Jan. 28, 2021

(65) Prior Publication Data
US 2022/0327747 A1  Oct. 13, 2022

(30) Foreign Application Priority Data
Jul. 25, 2019 (JP) .................. 2019-136907

(51) Int. Cl.
*G06T 11/00* (2006.01)
*G06Q 30/0601* (2023.01)

(52) U.S. Cl.
CPC .......... *G06T 11/00* (2013.01); *G06Q 30/0643* (2013.01)

(58) Field of Classification Search
CPC ............. G06Q 30/0643; G06F 2111/18; G06F 3/0481; G06F 3/04817; G06F 9/4443;
(Continued)

(56) References Cited

U.S. PATENT DOCUMENTS

| 5,930,769 A | 7/1999 | Rose |
| 2001/0026272 A1* | 10/2001 | Feld ....................... A41H 3/007 345/585 |

(Continued)

FOREIGN PATENT DOCUMENTS

| JP | 2001-502090 A | 2/2001 |
| JP | 2002-133252 A | 5/2002 |

(Continued)

OTHER PUBLICATIONS

International Search Report and Written Opinion of PCT Application No. PCT/JP2020/026957, issued on Sep. 29, 2020, 10 pages of ISRWO.

*Primary Examiner* — Yingchun He
(74) *Attorney, Agent, or Firm* — CHIP LAW GROUP

(57) ABSTRACT

The present technology relates to an information processing device, an information processing method, and a program causing a user to be able to appropriately select a fashion item. An information processing device includes a display control unit configured to control display of try-on images including images in which fashion items are superimposed on a user trying on try-on items corresponding to the fashion items. The information processing device is provided in, for example, a moving object such as a cart. The present technology can be applied to, for example, a system that performs electronic commerce of a fashion system.

22 Claims, 27 Drawing Sheets

(58) Field of Classification Search
CPC .............. G06F 3/04847; G06F 11/3664; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017

See application file for complete search history.

(56) References Cited

U.S. PATENT DOCUMENTS

| | | | |
|---|---|---|---|
| 2005/0157175 | A1 | 7/2005 | Takamatsu et al. |
| 2009/0295825 | A1 | 12/2009 | Takamatsu et al. |
| 2016/0035132 | A1* | 2/2016 | Shuster .................. G09G 5/026 345/633 |
| 2016/0278444 | A1* | 9/2016 | Jordan ................... A41D 1/002 |
| 2017/0000203 | A1* | 1/2017 | Jung ...................... A41D 27/24 |
| 2020/0320769 | A1* | 10/2020 | Chen ...................... G06F 18/214 |
| 2022/0327747 | A1* | 10/2022 | Suzuki ................... G06Q 30/06 |

FOREIGN PATENT DOCUMENTS

| | | | | |
|---|---|---|---|---|
| JP | 2005-099956 A | 4/2005 | | |
| JP | 2015-181314 A | 10/2015 | | |
| WO | 98/015904 A1 | 4/1998 | | |
| WO | WO-2012141319 A1 * | 10/2012 | ............. | G06Q 30/00 |
| WO | WO-2016097732 A1 * | 6/2016 | ........... | G06F 3/0482 |

\* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/026957 filed on Jul. 10, 2020, which claims priority benefit of Japanese Patent Application No. JP 2019-136907 filed in the Japan Patent Office on Jul. 25, 2019. Each of the above-referenced applications is hereby incorporated herein by reference in its entirety.

TECHNICAL FIELD

The present technology relates to an information processing device, an information processing method, and a program, and more particularly, to an information processing device, an information processing method, and a program that allow a user to appropriately select a fashion item.

BACKGROUND ART

In the related art, systems in which virtual models in videos wear desired clothes and video viewpoints can be changed in online shopping have been disclosed (for example, see PTL 1).

CITATION LIST

Patent Literature

[PTL 1]
JP 2002-133252 A

SUMMARY

Technical Problem

In the invention disclosed in PTL 1, however, a user cannot confirm a wearing feeling, a touch feeling, or the like. Therefore, purchased clothes are considerably different from images assumed by the user in some cases.

The present technology has been devised in view of such circumstances and allows a user to appropriately select a fashion item such as clothing.

Solution to Problem

According to an aspect of the present technology, an information processing device includes a display control unit configured to control display of try-on images including images in which fashion items are superimposed on a user trying on try-on items corresponding to the fashion items.

According to another aspect of the present technology, an information processing method includes controlling display of try-on images including images in which fashion items are superimposed on a user trying on try-on items corresponding to the fashion items.

According to still another aspect of the present technology, a program causes a computer to perform processing for controlling display of try-on images including images in which fashion items are superimposed on a user trying on try-on items corresponding to the fashion items.

According to still another aspect of the present technology, display of try-on images including images in which fashion items are superimposed on a user trying on try-on items corresponding to the fashion items is controlled.

DESCRIPTION OF EMBODIMENTS

Hereinafter, modes for carrying out the present technology will be described. The description will be made in the following order.
1. Embodiment
2. Examples
3. Others

1. Embodiment

Embodiments of the present technology will be described with reference to FIGS. 1, 2, 3, 4, 5, 6, 7, 8, 9, 10, 11, 12, 13, 14, 15, 16, 17, 18, 19, 20, 21, 22, 23, 24, 25A, 25B, 25C, 25D, and 25E.

<Exemplary Configuration of Information Processing System 1>

Figure 1:
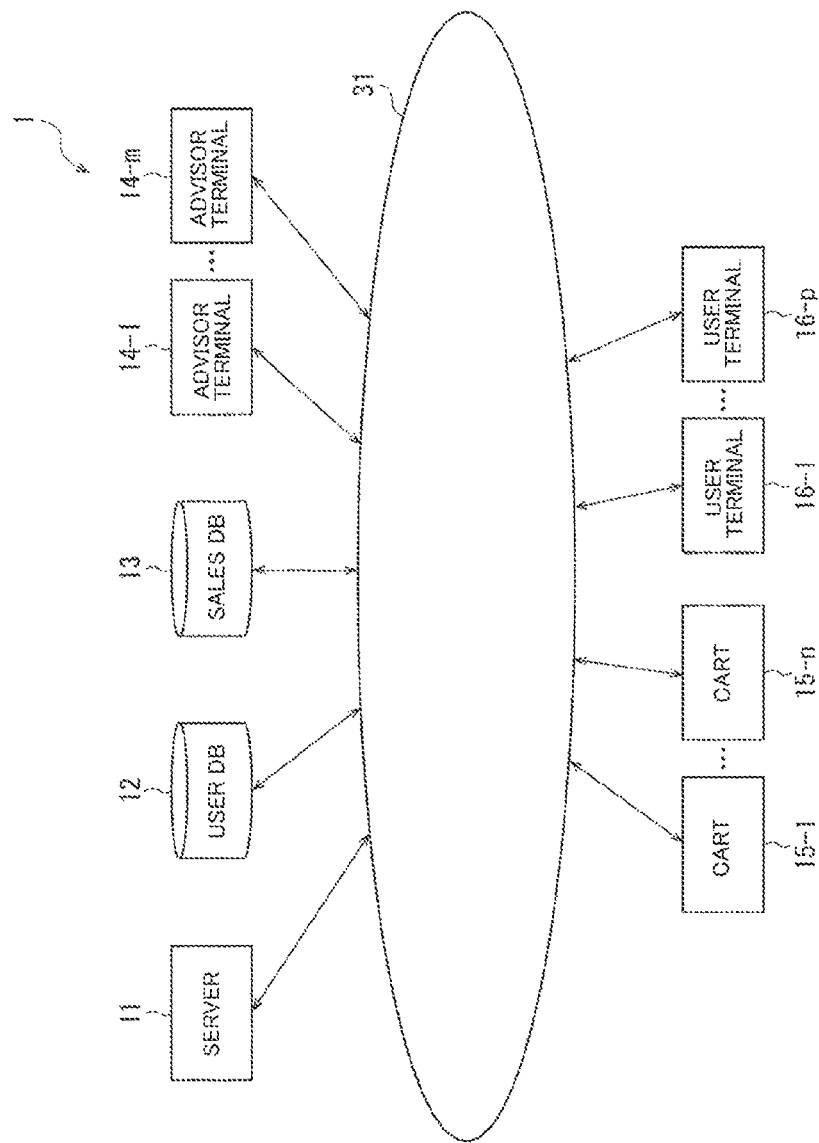
FIG. 1 is a block diagram illustrating an exemplary configuration of an information processing system to which the present technology is applied.

FIG. 1 is a block diagram illustrating an embodiment of an information processing system 1 to which the present technology is applied.

The information processing system 1 is a system that performs electronic commerce (e-commerce or online shopping) of fashion items (hereinafter simply referred to as items). Items handled in the information processing system 1 include items which are tried on when purchased, for example, clothes, small articles, and shoes (including sandals). The kinds of clothes are not particularly limited and include various kinds of upper garments, bottom garments, outer wears, and inner wears (including underwear). The small articles include, for example, neckties, socks (including stockings and tights), gloves, hats, scarves, stoles, mufflers, shawls, and belts. Further, items handled by the information processing system 1 may include bags, glasses, sunglasses, watches, umbrellas, and accessories.

As will be described below, in the information processing system 1, differently from normal e-commerce, a user can try on a try-on item corresponding to each item and select the item.

The information processing system 1 includes a server 11, a user database (DB) 12, a sales database (DB) 13, advisor terminals 14-1 to 14-*m*, carts 15-1 to 15-*n*, user terminals 16-1 to 16-*p*, and a network 31. The server 11, the user DB 12, the sales database (DB) 13, the advisor terminals 14-1 to 14-*m*, the carts 15-1 to 15-*n*, and the user terminals 16-1 to 16-*p* are connected to each other via the network 31 to be able to communicate with each other.

When it is not necessary to distinguish the advisor terminals 14-1 to 14-*m*, the carts 15-1 to 15-*n*, and the user terminals 16-1 to 16-*q* from each other, the advisor terminals 14-1 to 14-*m*, the carts 15-1 to 15-*n*, and the user terminals 16-1 to 16-*q* are simply referred to as the advisor terminal 14, the cart 15, and the user terminal 16.

The server 11 performs processing such as e-commerce, suggestion of items to users, learning of preferences of the users for items, introduction of advisors, and the like.

Here, advisors are people that give advice about fashion to users. For example, advisors are employees (for example, sales staff of shops or the like) of sellers (for example companies, shops, or the like) that sell items, designers, fashion reviewers, editors of fashion magazines, and the like.

Two or more servers 11 may be provided. For example, a different server 11 may be provided for each seller.

The user DB 12 is a database that stores user information regarding each user who purchases an item. The user information includes, for example, authentication data, a profile, a purchase history, preference information, human relationship information, and settlement information of each user.

The authentication data is data used to authenticate each user. A type of data authentication does not particularly matter. For example, the authentication data is considered to be a facial image, fingerprint data, iris data, an ID, or the like.

The profile includes, for example, a name, an age, a gender, a nationality, a vocation, a height, a weight, and a size of each body part of a user.

The purchase history includes, for example, a history of items previously purchased by a user. For example, a purchase history of items other than fashion items may be included.

The preference information includes information indicating preferences of a user for items. For example, a preference of a user for clothing which is one item is indicated by one or more items among a preferred brand, a country of manufacture, a type (for example, business, feminine, casual, street, sporty, or the like), a color, a pattern, a form, a material, a size, a fitting feeling, or the like.

For example, the preference information is input by a user himself or herself or is learned by the server 11 based on the purchase history or the like.

For example, information indicating preferences of a user for items other than fashion items may be included. For example, information regarding hobbies, a preferred lifestyle, a preferred celebrity, or the like may be included.

The human relationship information includes, for example, a family structure and acquaintance relationships of a user. The acquaintance relationships of a user include, for example, acquaintance relations of the real world and a social networking service (SNS) on a network.

For example, the human relation information is input by a user himself or herself or is learned by the server 11 based on activities or the like on an SNS.

The settlement information includes, for example, a settlement method of a user and a credit card number, or the like.

The sales DB 13 is a database that stores item information regarding items sold in electronic commerce, seller information regarding sellers that sell items, and advisor information regarding advisors.

The item information includes, for example, a kind, a commodity name, a model name, a brand, a country of manufacture, a feature, a size, a price, a seller, or an image of each item. Features of an item include, for example, a color, a pattern, a form, and a material of each item.

The seller information includes, for example, a name, a location, and a contact information of each seller and identification information (for example, an automobile license number or the like) of the cart 15 owned or rented by the seller.

The advisor information includes, for example, a profile and a face photo of each advisor, a fashion field good of expertise, and self-appeal of each advisor. The profile of the advisor includes, for example, a name, an age, a gender, a vocation, a nationality, a workplace (for example, a seller for whom they work), contact information, and available languages.

The advisor terminal 14 is an information processing terminal used by each advisor. A kind of advisor terminal 14 does not particularly matter as long as bidirectional communication (for example, a video telephone or the like) with the cart 15 using an image and sound is possible. For example, the advisor terminal 14 is configured by a personal computer (PC), a tablet terminal, a smartphone, a mobile phone, or the like.

For example, the cart 15 is used for a seller to perform selling, promotion, or the like of items. The cart 15 can be moved in an unmanned manner by automatic driving or telemanipulation.

One seller may use a plurality of carts 15 or a plurality of sellers may share one cart 15. The seller can own the cart 15 and can also rent the cart 15 from, for example, a rental company. Further, the seller may sell only an item of a specific brand or items of a plurality of brands using the cart 15.

Hereinafter, a seller who owns or rents the cart 15 is referred to as an owner of the cart 15.

The user terminal 16 is, for example, an information processing terminal used for a user to purchase an item. A kind of user terminal 16 does not matter as long as it can access the server 11 and perform electronic commerce. For example, the user terminal 16 is configured by a PC, a tablet terminal, a smartphone, a mobile phone, or the like.

<Exemplary Configuration of Server 11>

Figure 2:
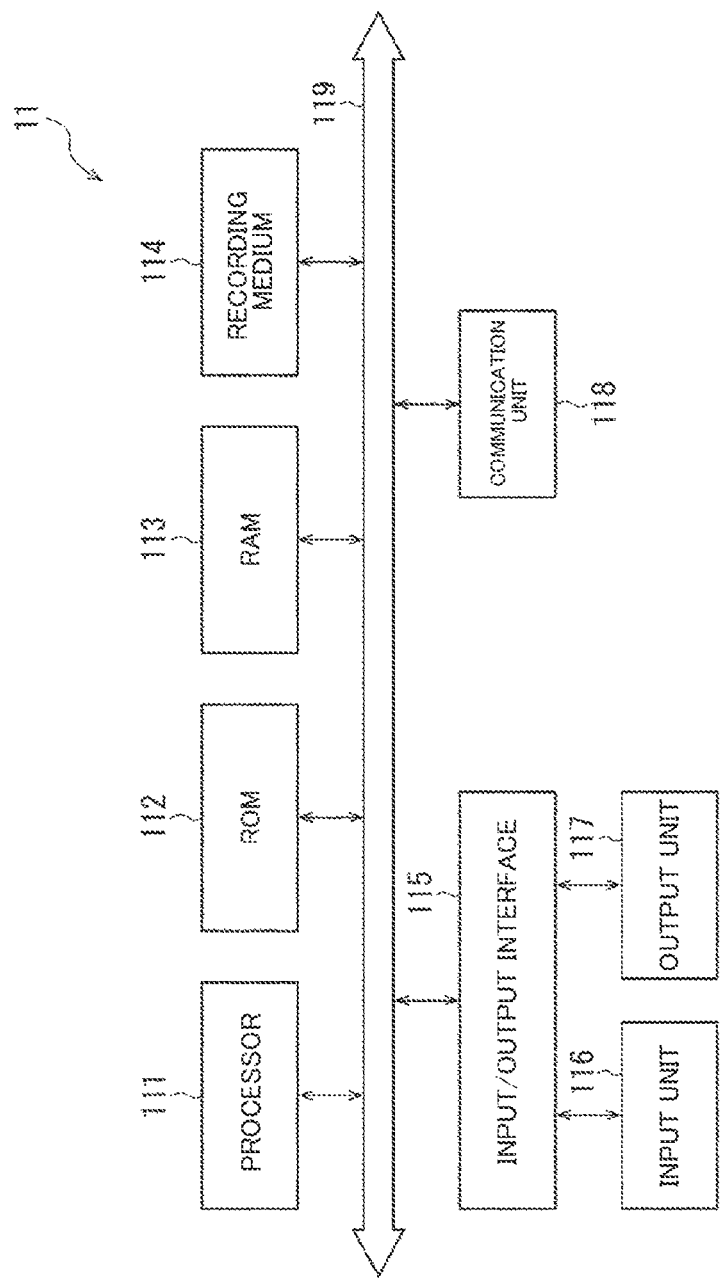
FIG. 2 is a block diagram illustrating an exemplary configuration of a server.

FIG. 2 is a block diagram illustrating an exemplary configuration of the server 11 of the information processing system 1 in FIG. 1.

The server 11 includes a processor 111, a read-only memory (ROM) 112, a random access memory (RAM) 113, a recording medium 114, an input/output interface 115, an input unit 116, an output unit 117, and a communication unit 118. The processor 111, the ROM 112, the RAM 113, the recording medium 114, the input/output interface 115, and the communication unit 118 are connected to each other via a bus 131.

The processor 111 includes, for example, one or more processors configured with an arithmetic circuit such as a micro processing unit (MPU) and various processing circuits. The processor 111 controls the whole server 11.

The ROM 112 stores, for example, control data such as arithmetic parameters and a program used by the processor 111.

The RAM 113 temporarily stores, for example, a program executed by the processor 111 and data used for processing of the processor 111.

The recording medium 114 is configured by a magnetic disk, an optical disc, a magneto-optical disc, or a semiconductor memory. The recording medium 114 stores various programs, applications, data, and the like. The recording medium 114 may be detachably mounted on the server 11.

The input/output interface 115 connects, for example, the input unit 116 or the output unit 117. The input/output interface 115 is configured by, for example, a USB terminal, a DVI terminal, an HDMI (registered trademark) terminal, or any of various processing circuits.

The input unit 116 includes, for example, various input devices and is used to input various kinds of data, instructions, or the like. The type or number of input devices included in the input unit 116 is not particularly limited. A touch panel, a button, a switch, a microphone, and the like are used as necessary.

The output unit 117 includes, for example, various output devices capable of outputting one or more of visual information, auditory information, and tactile information. The type or number of output devices included in the output unit 117 is not particularly limited. A display device, a speaker, a light-emitting device, a vibration element, and the like are used as necessary.

The communication unit 118 includes one or more communication devices and performs communication with other devices of the information processing system 1 via the network 31 in conformity with a predetermined communication scheme. Any wired or wireless communication scheme can be adopted by the communication unit 118. The communication unit 118 may support a plurality of communication schemes.

In the following description of the server 11, the input/output interface 115 and the bus 131 will not be described. For example, when the processor 111 and the output unit 117 transmit and receive data via the bus 131 and the input/output interface 115, the bus 131 and the input/output interface 115 will not be described. When the processor 111 and the output unit 117 transmit and receive data, the processor 111 and the output unit 117 will be described.

<Exemplary Configuration of Information Processing Unit 151>

Figure 3:
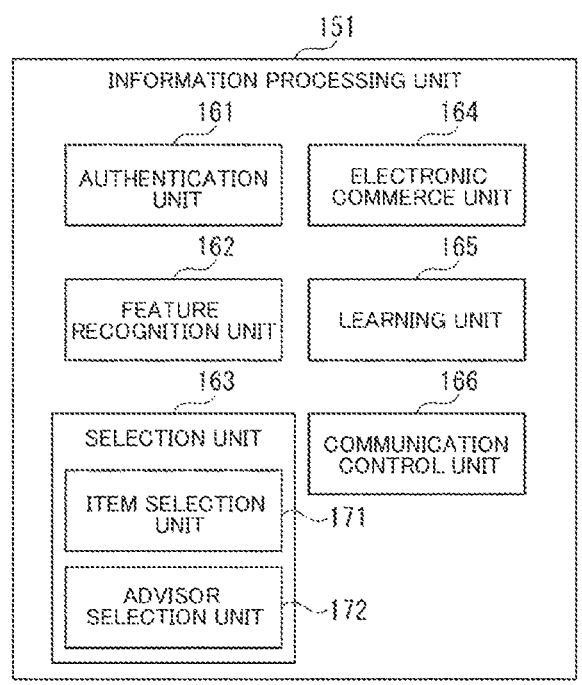
FIG. 3 is a block diagram illustrating an exemplary configuration of an information processing unit realized by a processor of the server.

FIG. 3 illustrates an exemplary configuration of an information processing unit 151 which is a part of a function realized by the processor 111 of the server 11 executing a predetermined control program.

The information processing unit 151 includes an authentication unit 161, a feature recognition unit 162, a selection unit 163, an electronic commerce unit 164, a learning unit 165, and a communication control unit 166. The selection unit 163 includes an item selection unit 171 and an advisor selection unit 172.

The authentication unit 161 authenticates the user using the cart 15 based on authentication data of each user stored in the user DB 12 and authentication data transmitted from the cart 15.

The feature recognition unit 162 recognizes features of the outer appearance of the user using the cart 15 based on an image of the user transmitted from the cart 15 and user information stored in the user DB 12. The feature recognition unit 162 recognizes the features of the outer appearance of a companion (for example, a family member, a friend, or the like) of the user using the cart 15 based on an image of the companion of the user transmitted from the cart 15.

The item selection unit 171 selects an item suggested to the user using the cart 15 or the companion of the user and transmits data regarding the selected item to the cart 15 via the communication unit 118 and the network 31.

The advisor selection unit 172 selects an advisor who will be introduced to the user using the cart 15 and transmits data regarding the selected advisor to the cart 15 via the communication unit 118 and the network 31.

The electronic commerce unit 164 performs communication with the user DB 12, the sales DB 13, the advisor terminal 14, the cart 15, and the user terminal 16 via the communication unit 118 and the network 31 and performs various steps of processing related to the electronic commerce.

The learning unit 165 performs learning of preferences of the user based on observation data of the user transmitted from the cart 15 and user information or the like stored in the user DB 12. The observation data is data indicating a result obtained by observing the user using the cart 15. The learning unit 165 stores preference information of the user in the user DB 12 via the communication unit 118 and the network 31.

The communication control unit 166 controls communication processing by the communication unit 118.

<Exemplary Configuration of Information Processing Device 201>

Figure 4:
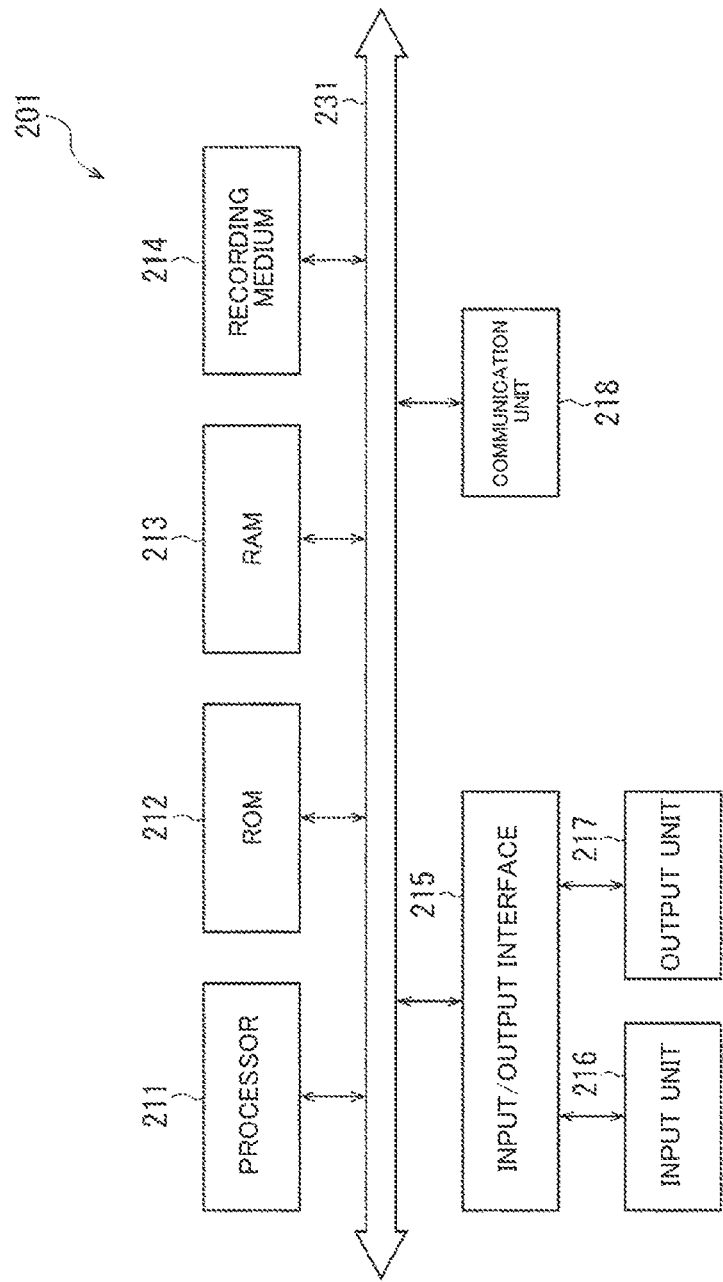
FIG. 4 is a block diagram illustrating an exemplary configuration of an information processing terminal.

FIG. 4 illustrates an exemplary configuration of the information processing device 201 which can configure each advisor terminal 14 and each user terminal 16 of the information processing system 1. In the drawing, the same reference numerals with two low-order digits are given to corresponding units in the server 11 in FIG. 2.

The information processing device 201 has the same configuration as the server 11, and thus description thereof will be omitted.

<Exemplary Configuration of Cart 15>

Figure 5:
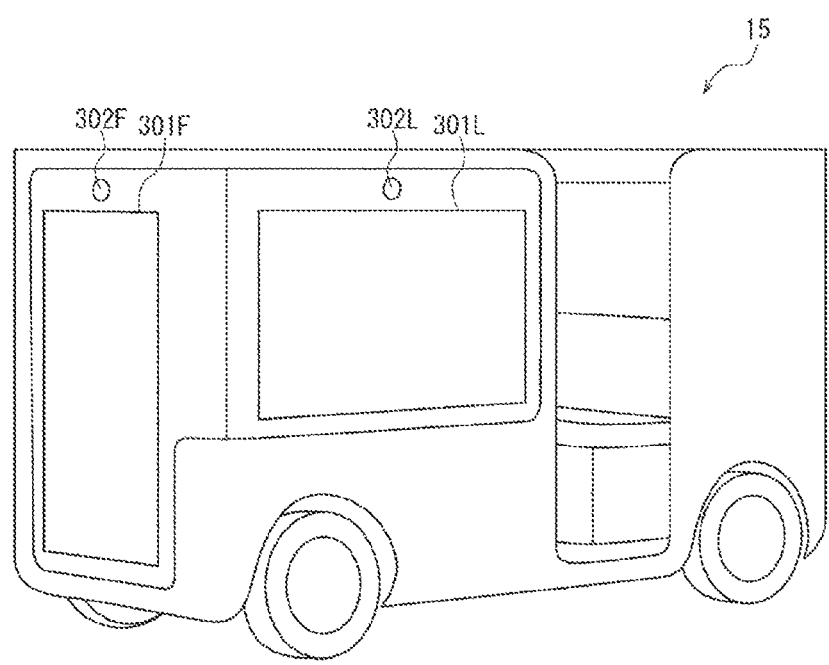
FIG. 5 is a diagram illustrating an exemplary configuration of the exterior appearance of a cart.

FIG. 5 illustrates an exemplary configuration of the exterior appearance of the cart 15. FIG. 5 illustrates an exemplary configuration of the exterior appearance when the cart 15 is viewed from a diagonally left front.

The cart 15 is a moving object that can move in an unmanned manner by automatic driving or telemanipulation.

When the cart 15 is moving, people may board it. A driver may be able to drive the cart 15.

As the cart 15, for example, an electric automobile which moves by a motor such as an electric cart is exemplified. The cart 15 according to the embodiment is not limited to an electric automobile.

A display unit 311F, a display unit 311L, a display unit 311R (not illustrated), and a display unit 311B (not illustrated) are provided on the front surface, the left side surface, the right side surface, and the back surface of the cart 15, respectively. The display units 311F to 311B are configured by, for example, a thin display device such as a liquid crystal display (LCD) or an organic EL panel.

A camera 312F, a camera 312L, a camera 312R (not illustrated), and a camera 312B (not illustrated) are provided on the front surface, the left side surface, the right side surface, and the back surface of the cart 15. The camera 312F mainly images the area in front of the cart 15. The camera 312L mainly images the area to the left of the cart 15. The camera 312R mainly images the area to the right of the cart 15. The camera 312B mainly images the area behind the cart 15.

Types or specifications of the cameras 312F to 312B are not particularly limited. For example, the cameras 312F to 312B may be configured by stereo cameras.

Inside the cart 15, there is a space for trying things on (hereinafter referred to as a try-on space). In the try-on space, for example, a camera that images a user, a microphone that collects a sound of the user, a display device that displays a try-on image which is an image in which the user virtually tries on an item, an information processing terminal that performs telecommunication or information processing, and the like are provided. The try-on space is preferably a closed space separated from the outside to protect security and privacy of the user.

As will be described below, the user can try on a try-on item in the try-on space or check a try-on image.

Figure 6:
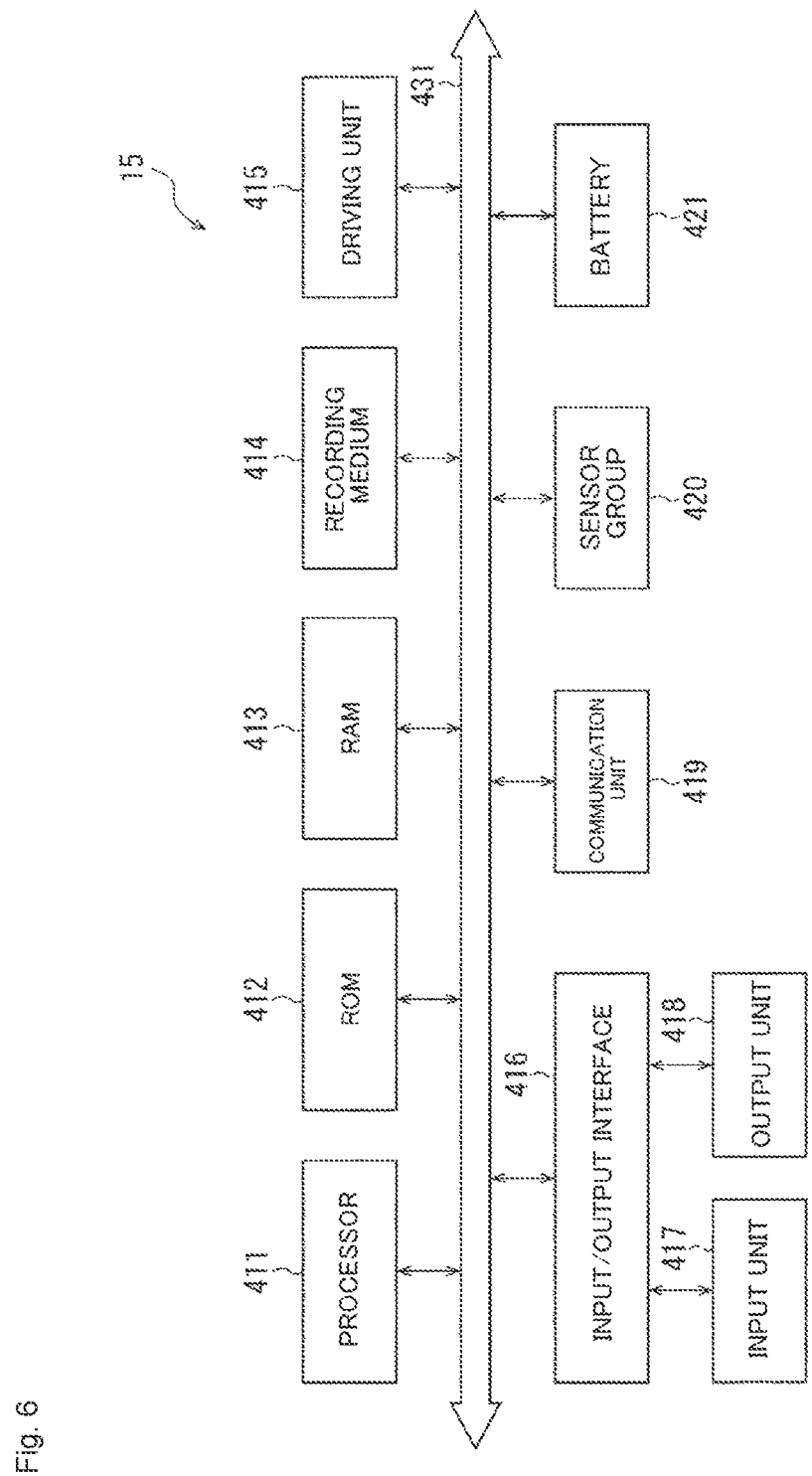
FIG. 6 is a block diagram illustrating an exemplary configuration of a function of the cart.

FIG. 6 illustrates an exemplary configuration of a function of the cart 15. The cart 15 includes a processor 411, a ROM 412, a RAM 413, a recording medium 414, a driving unit 415, an input/output interface 416, an input unit 417, an output unit 418, a communication unit 419, a sensor group 420, a battery 421, and a bus 431. The processor 411, the ROM 412, the RAM 413, the recording medium 414, the driving unit 415, the input/output interface 416, the communication unit 419, the sensor group 420, and the battery 421 are connected to each other via a bus 431.

The processor 411 includes, for example, one or more processors configured with an arithmetic circuit such as an MPU and various processing circuits. The processor 411 controls the whole cart 15.

The ROM 412 stores, for example, control data such as arithmetic parameters and a program used by the processor 411.

The RAM 413 temporarily stores, for example, a program executed by the processor 411 and data used for processing of the processor 411.

The recording medium 414 is configured by a magnetic disk, an optical disc, a magneto-optical disc, or a semiconductor memory. The recording medium 414 stores various programs, applications, data, and the like. The recording medium 414 may be detachably mounted on the cart 15.

The driving unit 415 includes, for example, various devices (or mechanisms) related to movement of the cart 15, such as a power source such as a motor, wheels, transmission devices transmitting power generated by the power source to the wheels, and a brake mechanism.

The input/output interface 416 connects, for example, the input unit 417 or the output unit 418. The input/output interface 416 is configured by, for example, a USB terminal, a DVI terminal, an HDMI (registered trademark) terminal, or various processing circuits.

The input unit 417 includes, for example, various input devices and is used to input driving and manipulation of the cart 15, various kinds of data, instructions, or the like. The type or number of input devices of the input unit 417 is not particularly limited. For example, the input unit 417 includes a game controller including a direction key, a button, and a stick-shaped device, controllers including a steering wheel, a shift lever, an acceleration pedal, and a brake pedal, a touch panel, a button, and a switch.

The output unit 418 includes, for example, various output devices capable of outputting one or more of visual information, auditory information, and tactile information. For example, the output unit 418 includes a display device that displays an image inside or outside of the cart 15, such as the display units 311F to 311B. For example, the output unit 418 includes a projector that performs projection mapping or the like. The type and number of output devices included in the output unit 418 is not particularly limited. A display device, a speaker, a light-emitting device, a vibration element, and the like are used as necessary.

The communication unit 419 includes one or more communication devices and performs communication with other devices of the information processing system 1 via the network 31 in conformity with a predetermined communication scheme. Any wired or wireless communication scheme can be adopted for the communication unit 419. The communication unit 419 may support a plurality of communication schemes.

The sensor group 420 includes various sensors detecting a state or the like of the cart 15. For example, the sensor group 420 includes a gyro sensor, an acceleration sensor, an inertial measurement unit (IMU), and a sensor detecting a motor rotation speed, a rotation speed of a wheel, or the like.

For example, the sensor group 420 includes various sensors detecting external information. For example, the sensor group 420 includes imaging devices such as the above-described cameras 312F to 312B. Examples of the imaging devices include a time of flight (ToF) camera, a stereo camera, a monocular camera, and an infrared camera. For example, the sensor group 420 includes an environmental sensor that detects weather, a climate, or the like and a surrounding information detection sensor that detects nearby objects. The environmental sensor is configured by, for example, a raindrop sensor, a fog sensor, a sunshine sensor, a snow sensor, or the like. The surrounding information detection sensor is configured by, for example, an ultrasonic sensor, a radar, a light detection and ranging, laser imaging detection and ranging (LiDAR), a sonar, or the like.

Further, for example, the sensor group 420 includes various positional sensors that detect a current position. For example, the sensor group 420 includes a global navigation satellite system (GNSS) receiver that receives a GNSS signal from a GNSS satellite.

For example, the sensor group 420 includes various sensors that detect internal information of the cart 15. For example, the sensor group 420 includes an imaging device that images the inside of the cart 15 and a microphone that collects an internal sound of the cart 15.

The communication unit 419 includes one or more communication devices and performs communication with other devices of the information processing system 1 via the network 31 in conformity with a predetermined communication scheme. Any wired or wireless communication scheme can be adopted by the communication unit 419. The communication unit 419 may support a plurality of communication schemes.

The battery 421 is an internal power source included in the cart 15. Each device driven with power in the cart 15 is driven by, for example, power supplied from the battery 421. The cart 15 can also be driven by power supplied from an external power source or the like.

<Exemplary Configuration of Information Processing Unit 451>

Figure 7:
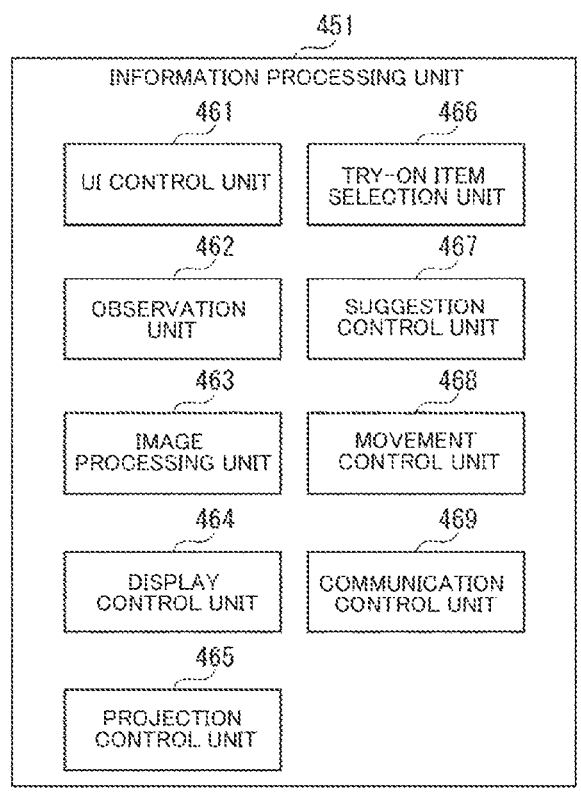
FIG. 7 is a block diagram illustrating an exemplary configuration of an information processing unit realized by a processor of the cart.

FIG. 7 illustrates an exemplary configuration of an information processing unit 451 which is a part of a function realized by the processor 411 of the cart 15 executing a predetermined control program.

The information processing unit 451 includes a user interface (UI) control unit 461, an observation unit 462, an image processing unit 463, a display control unit 464, a projection control unit 465, a try-on item selection unit 466, a suggestion control unit 467, a movement control unit 468, and a communication control unit 469.

The UI control unit 461 controls the input unit 417 and the output unit 418 such that a user interface of the cart 15 is controlled.

The observation unit 462 observes the inside and the surroundings of the cart 15 based on sensor data supplied from the sensor group 420. For example, the observation unit 462 observes the user using the cart 15 and generates observation data indicating an observed result.

The image processing unit 463 processes an image displayed inside or outside of the cart 15. For example, the image processing unit 463 generates a try-on image and causes a display device included in the output unit 418 to display the try-on image.

The display control unit 464 controls display of an image by the display device included in the output unit 418. For example, the display control unit 464 controls display of a try-on image.

The projection control unit 465 controls projection of an image of each item for the user with a projector included in the output unit 418 in accordance with a projection mapping technology.

The try-on item selection unit 466 selects try-on items which will be suggested to the user.

The suggestion control unit 467 controls the output unit 418 or the like and controls the suggestion of the try-on items selected by the try-on item selection unit 466 to the user.

The try-on items include, for example, try-on clothes, try-on articles, and try-on shoes. The try-on items are considered to be, for example, colorless and plain. Here, the colorlessness is white or the color of a material itself (that is, an achromatic color) of which a try-on item is made.

The movement control unit 468 controls movements of the cart 15 by controlling the driving unit 415.

The communication control unit 469 controls communication processing by the communication unit 419.

<Processing of Information Processing System 1>

Next, processing of the information processing system 1 will be described with reference to FIGS. 8, 9, 10, 11, 12, 13, 14, 15, 16, 17, 18, 19, 20, 21, 22, 23, 24, 25A, 25B, 25C, 25D, and 25E.

Hereinafter, an example of a case in which electronic commerce of clothes among fashion items is mainly performed will be described.

<Processing of Cart 15>

First, processing performed by the cart 15 will be described with reference to the flowchart of FIG. 8.

For example, this processing starts when a power supply for electric components of the cart 15 is turned on, and ends when the power supply is turned off.

In step S1, the cart 15 performs normal display. For example, the display units 301F to 301L or the like outside of the cart 15 display images of content for unspecified people around the cart 15 under the control of the display control unit 464.

Figure 9:
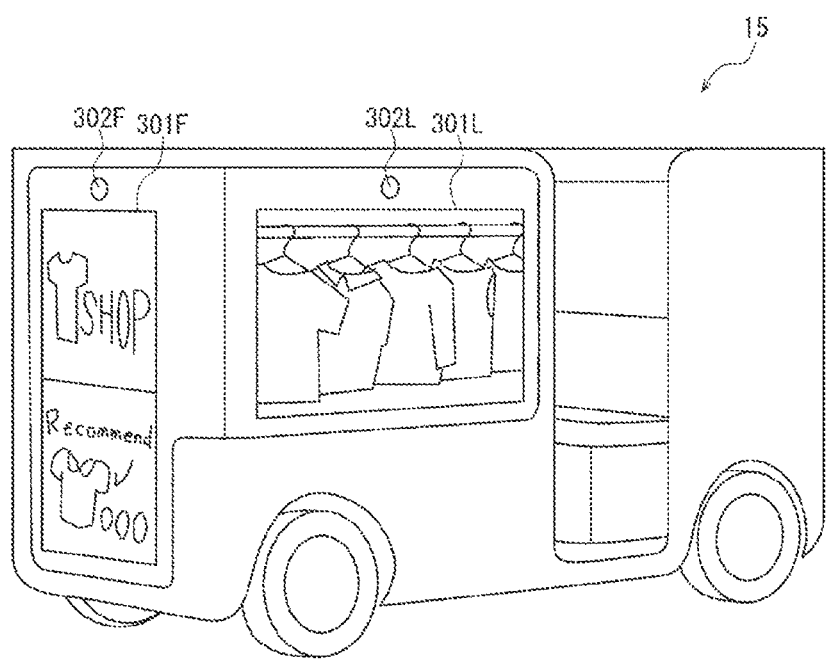
FIG. 9 is a diagram illustrating a display example of a normal display of the cart.

FIG. 9 illustrates an example of an image displayed by the display units 301F and 301L through this processing.

In the upper part of the display unit 301F, a name (for example, a shop name) of an owner of the cart 15, a logo mark, or the like is displayed. In the lower part of the display unit 301F, images of currently recommended items are displayed. On the display unit 301L, images of parts of items handled by the owner of the cart 15 are displayed.

In step S2, the observation unit 462 determines whether reception starts. For example, the observation unit 462 detects a person interested in the cart 15 itself or the items displayed outside of the cart 15 based on images around the cart 15 imaged by the cameras 302F to 302B. The observation unit 462 repeats the determination processing of step S2 until the person interested in the items or the cart 15 is detected. When the person interested in the items or the cart 15 is detected, the observation unit 462 determines that the reception starts and the processing proceeds to step S3.

In step S3, the cart 15 notifies the server 11 that the reception starts. Specifically, the UI control unit 461 generates a reception start notification signal to notify that the reception starts. The communication unit 419 transmits the reception start notification signal to the server 11 via the network 31 under the control of the communication control unit 469.

Hereinafter, a person who is detected as the person interested in the items or the cart 15 and is a reception target is referred to as a user.

In step S4, the observation unit 462 starts observing the user. For example, observation unit 462 starts observing the user based on sensor data supplied from the sensor group 420. For example, the observation unit 462 observes the user based on an image obtained by imaging the user, a sound of the user collected by a microphone, or the like and starts processing for estimating and predicting a behavior, a feeling, or the like of the user.

In step S5, the UI control unit 461 determines whether authentication data of the user has been acquired.

In accordance with a type of authentication data, the authentication data is input by the user in some cases or is acquired automatically by the cart 15 in some cases.

For example, when ID authentication or fingerprint authentication is performed, the output unit 418 outputs an image or a sound urging input of the authentication data to get the user to input the authentication data under the control of the UI control unit 461. For example, when the user holds the user terminal 16 at a predetermined position of the cart 15, an ID is read from the user terminal 16.

For example, when face authentication is performed, the observation unit 462 extracts a facial image of the user from images captured by the cameras 302F to 302B so that the authentication data of the user is automatically acquired.

When it is determined that the authentication data of the user is acquired, the processing proceeds to step S6.

In step S6, the cart 15 transmits the authentication data of the user. Specifically, the communication unit 419 transmits the authentication data of the user to the server 11 via the network 31 under the control of the communication control unit 469.

Thereafter, the processing proceeds to step S7.

Conversely, when it is determined in step S5 that the authentication data of the user is not acquired, the processing of step S6 is skipped and the processing proceeds to step S7.

In step S7, the cart 15 transmits the image of the user. For example, the observation unit 462 extracts an image showing the outer appearance of the user from the images captured by the cameras 302F to 302B.

At this time, for example, the output unit 418 may guide the user to a predetermined position or may guide the user to take a predetermined pose using an image or a sound under the control of the UI control unit 461 so that the outer appearance of the user can be imaged more clearly.

The communication unit 419 transmits the image of the user to the server 11 via the network 31 under the control of the communication control unit 469.

In step S8, the observation unit 462 determines whether there is a companion. For example, the observation unit 462 performs processing for detecting the companion of the user based on the images captured by the cameras 302F to 302B. When the observation unit 462 determines that there is a companion, the processing proceeds to step S9.

For example, the user may be allowed to input presence or absence of the companion via the input unit 417.

In step S9, the cart 15 transmits the image of the companion. For example, the observation unit 462 extracts the image showing the outer appearance of the companion from the images captured by the cameras 302F to 302B.

At this time, for example, the output unit 418 may guide the companion to a predetermined position or may guide the companion to take a predetermined pose using an image or a sound under the control of the UI control unit 461 so that the outer appearance of the companion can be imaged more clearly.

The communication unit 419 transmits the image of the companion to the server 11 via the network 31 under the control of the communication control unit 469.

Thereafter, the processing proceeds to step S10.

Conversely, when it is determined in step S8 that there is no companion, the processing of step S9 is skipped and the processing proceeds to step S10.

In step S10, the cart 15 performs the reception processing, and then the processing proceeds to step S11.

Figure 10:
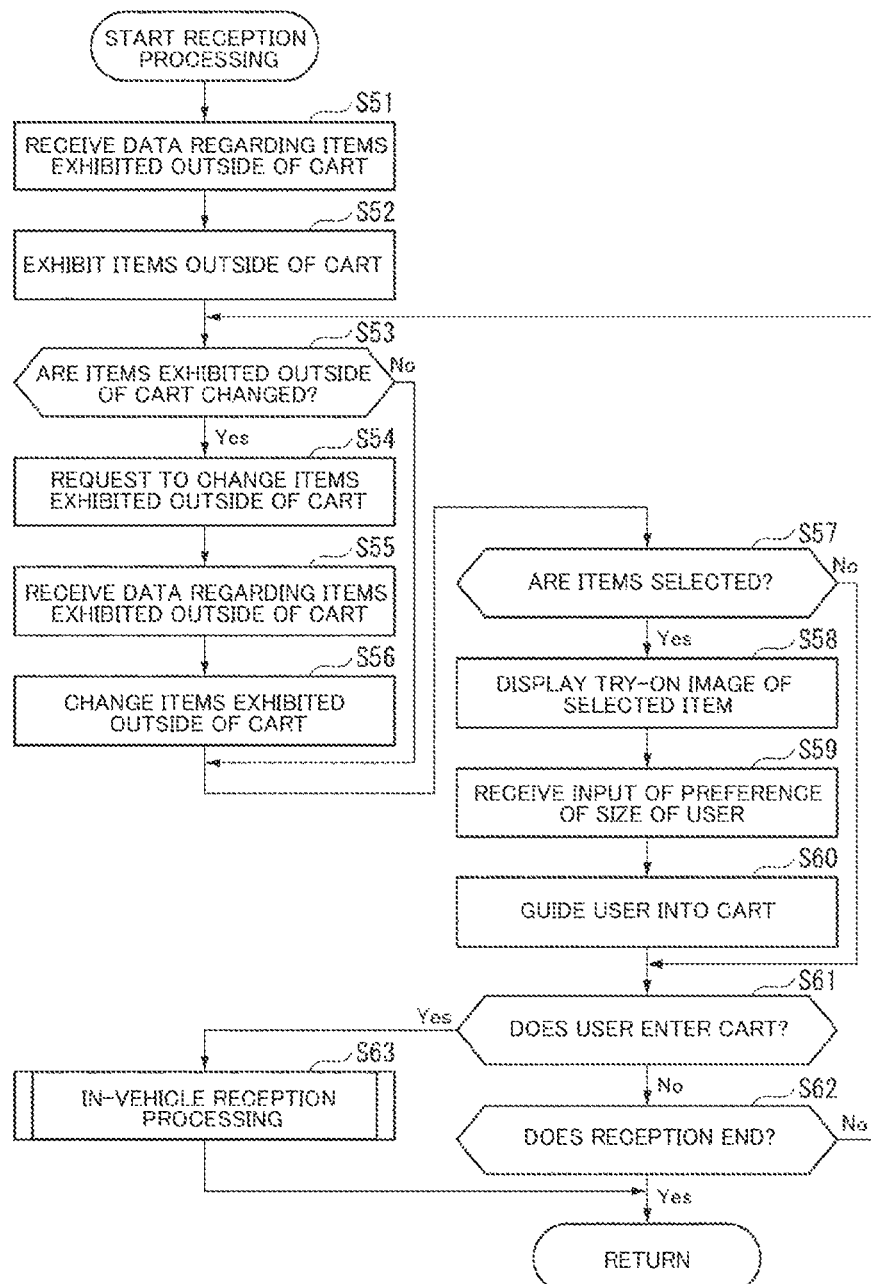
FIG. 10 is a flowchart illustrating details of reception processing.

Here, details of the reception processing will be described with reference to the flowchart of FIG. 10.

In step S51, the cart 15 receives data regarding the items exhibited outside of the cart 15.

Figure 21:
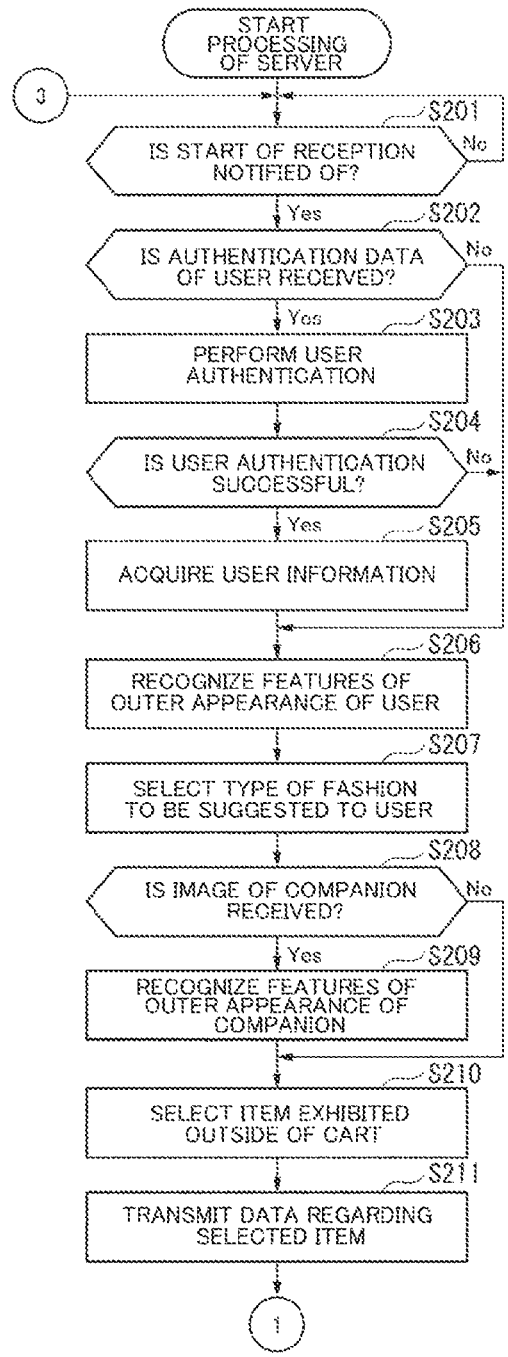
FIG. 21 is a flowchart illustrating processing of the server.

Specifically, in step S210 of FIG. 21 to be described below, the server 11 selects the items exhibited outside of the cart 15 based on the image of the user or the like. For example, an item preferred by the user or an item suitable for the user is selected. In step S211, the server 11 generates data regarding the selected item (hereinafter referred to as selected item data) and transmits the data to the cart 15.

The selected item data includes, for example, a commodity name and a model name of the selected item.

The image processing unit 463 receives the selected item data via the network 31 and the communication unit 419.

In step S52, the cart 15 exhibits the items outside of the cart 15. Specifically, the image processing unit 463 generates images for exhibiting items selected by the server 11. An external display unit of the cart 15 displays the images generated by the image processing unit 463 under the control of the display control unit 464.

Figure 11:
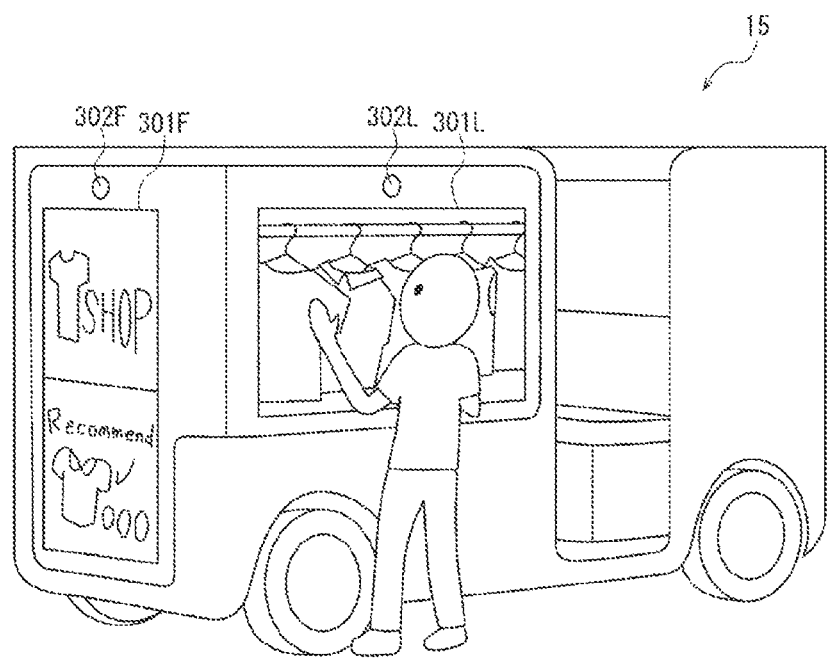
FIG. 11 is a diagram illustrating an example in which items are exhibited outside of the cart.

For example, as illustrated in FIG. 11, the plurality of selected items are exhibited on the display unit 301L. In this example, images in which the plurality of selected items are hung on and arranged like an actual shop are displayed.

Thus, a plurality of items selected for only the user are suggested to enhance a purchase desire or an interest of the user.

The images of all the items included in the selected item data may not necessarily be displayed at once on the display unit 301L. For example, when the user performs an operation or a gesture of moving the items to the left or right on the display unit 301L, the displayed items may be replaced to the left or right.

In step S53, the UI control unit 461 determines whether the items exhibited outside of the cart 15 are changed.

For example, when the user inputs an instruction to change the exhibited items via the input unit 417, the UI control unit 461 determines that the items exhibited outside of the cart 15 are changed. For example, when the observation unit 462 detects that the user shows a discontented expression or attitude to the exhibited items, the UI control unit 461 determines that the items exhibited outside of the cart 15 are changed.

When it is determined that the items exhibited outside of the cart 15 are changed, the processing proceeds to step S54.

In step S54, the cart 15 requests to change the items exhibited outside of the cart 15. Specifically, the UI control unit 461 generates item change request data to request to change the items exhibited outside of the cart 15.

At this time, for example, the user may be allowed to input a desired condition for items to be exhibited and the desired condition of the user may be included in the item change request data.

The communication unit 419 transmits the item change request data to the server 11 via the network 31 under the control of the communication control unit 469.

Figure 22:
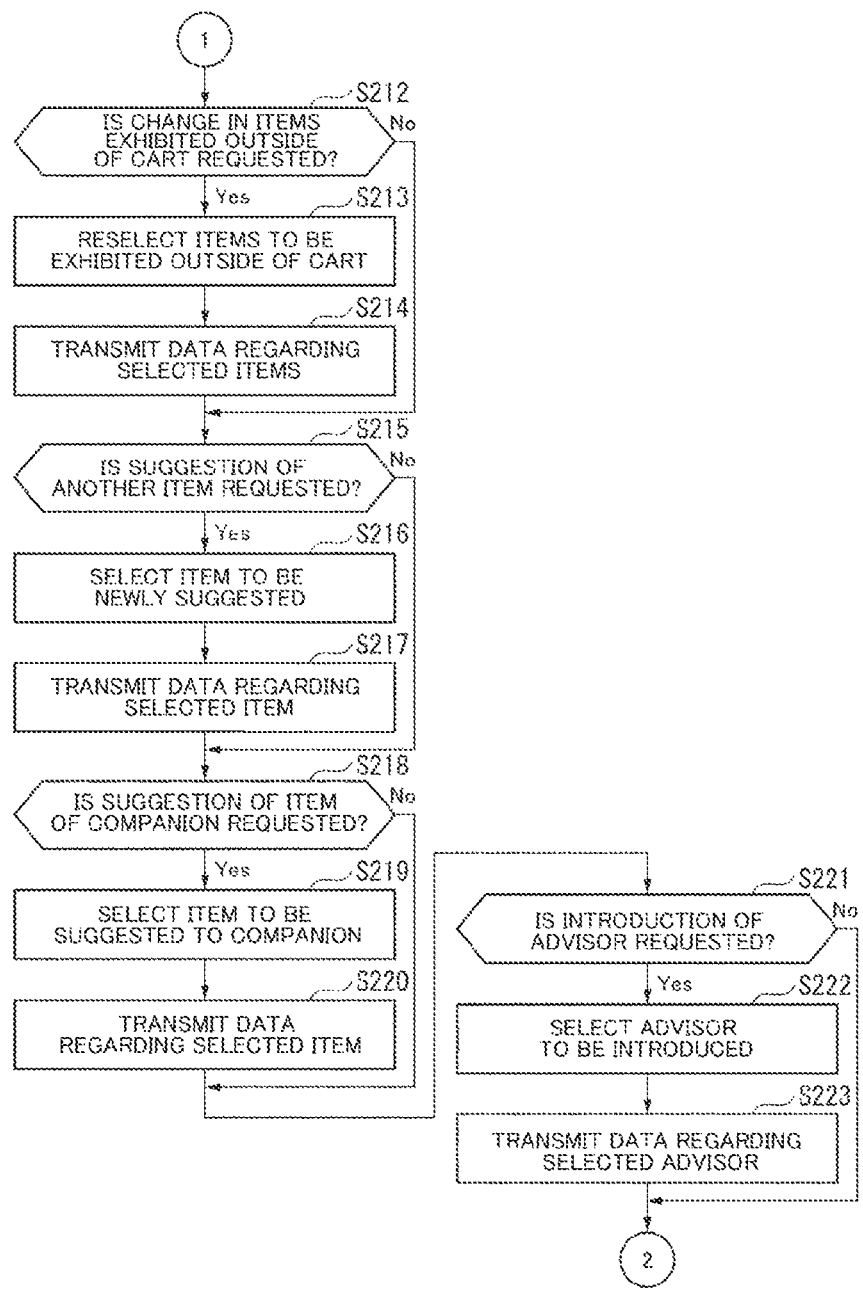
FIG. 22 is a flowchart illustrating the processing of the server.

On the other hand, the server 11 receives the item change request data in step S212 of FIG. 22 to be described below and reselect items to be exhibited outside of the cart 15 in step S213. In step S214, the server 11 generates selected item data regarding the selected items and transmits the selected item data to the cart 15.

In step S55, the data regarding the items exhibited outside of the cart 15 is received similarly to the processing of step S51.

In step S56, the cart 15 changes the items exhibited outside of the cart 15. That is, in the same processing as that of step S52, images for exhibiting the items reselected by the server 11 are displayed on the external display unit of the cart 15.

Thereafter, the processing proceeds to step S57.

Conversely, when it is determined in step S53 that the items exhibited outside of the cart 15 are not changed, the processing of steps S54 to S56 is skipped and the processing proceeds to step S57.

In step S57, the UI control unit 461 determines whether the items have been selected. For example, when the user performs an operation of selecting a desired item among the exhibited items via the input unit 417, the UI control unit 461 determines that the item has been selected. For example, when the observation unit 462 detects a gesture of the user selecting the desired item among the exhibited items, the UI control unit 461 determines that the item is selected. When it is determined that the item has been selected, the processing proceeds to step S58.

In step S58, the cart 15 displays a try-on image of the selected item. That is, the cart 15 displays the try-on image in which the user virtually tries on the selected item using an augmented reality (AR) technology.

For example, the output unit 418 outputs an image or a sound to urge the user to move to the front of the display unit 301F under the control of the UI control unit 461. When the user moves to the front of the display unit 301F, the image processing unit 463 generates a try-on image including an image in which the image of the selected item is superimposed on an image of the user captured by the camera 302F. The display unit 301F displays the generated try-on image under the control of the display control unit 464.

The try-on image is considered to be a moving image. In the try-on image, an item superimposed on the user follows a motion of the user in real time.

Figure 12:
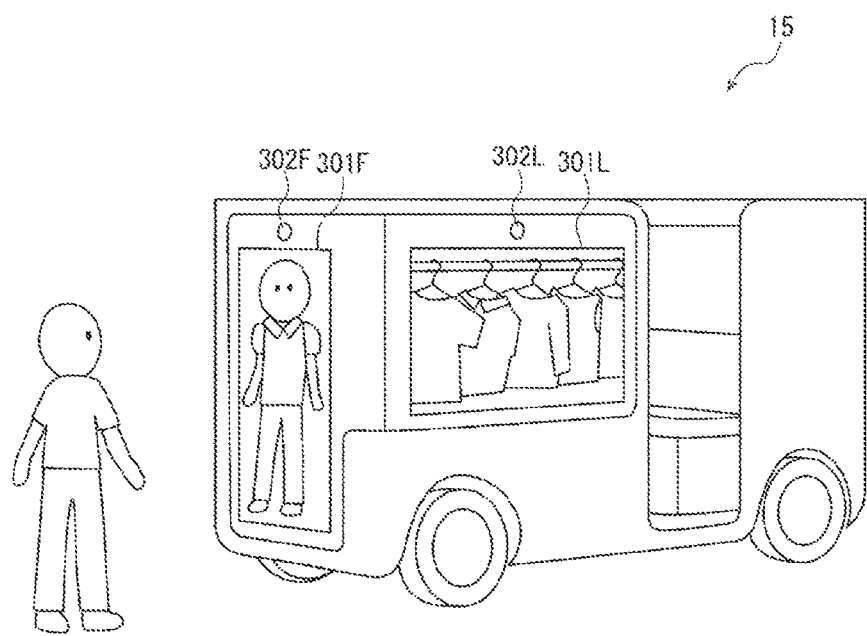
FIG. 12 is a diagram illustrating a display example of a fitting image outside of a vehicle.

FIG. 12 illustrates an example of a try-on image displayed through this processing. In this example, the user stands in front of the display unit 301F and the try-on image including an image of the whole body of the user is displayed on the display unit 301F.

Thus, the user can check an image in which the user tries on the item although the user does not actually try on the item.

In step S59, the cart 15 receives an input of preference of the size of the user. For example, the output unit 418 outputs an image or a sound to urge the user to input the preference of the size of the user under the control of the UI control unit 461.

Then, for example, a fitting feeling preferred by the user is input. The fitting feeling is selected from, for example, just fitting, loose fitting (comfortably), and tight fitting. Further, when the loose fitting or the tight fitting is selected, the degree of fitting may be selected.

When the user input the preference of the size via the input unit 417, the try-on item selection unit 466 acquires data indicating the input preference of the size.

In step S60, the cart 15 guides the user into the cart. For example, the output unit 418 outputs an image or a sound to urge the user to move into the cart 15 under the control of the UI control unit 461.

Thereafter, the processing proceeds to step S61.

Conversely, when it is determined in step S57 that the item is not selected, the processing of steps S58 to S60 is skipped and the processing proceeds to step S61.

In step S61, the observation unit 462 determines whether the user enters the cart. When it is determined that the user does not enter the cart, the processing proceeds to step S62.

In step S62, the UI control unit 461 determines whether the reception ends. When it is determined that the reception does not end, the processing returns to step S53.

Thereafter, the processing of steps S53 to S62 is repeatedly performed until it is determined in step S61 that the user enters the cart or it is determined in step S62 that the reception ends. Then, the items suggested outside of the cart 15 are changed appropriately. The user can change the item which he or she virtually tries on in the try-on image.

Conversely, for example, when it is determined in step S62 that the user is away from the cart 15 or the user has no purchase intention, the observation unit 462 determines that the reception ends, and thus the reception processing ends.

When it is determined in step S61 that the user enters the cart, the processing proceeds to step S63.

Figure 13:
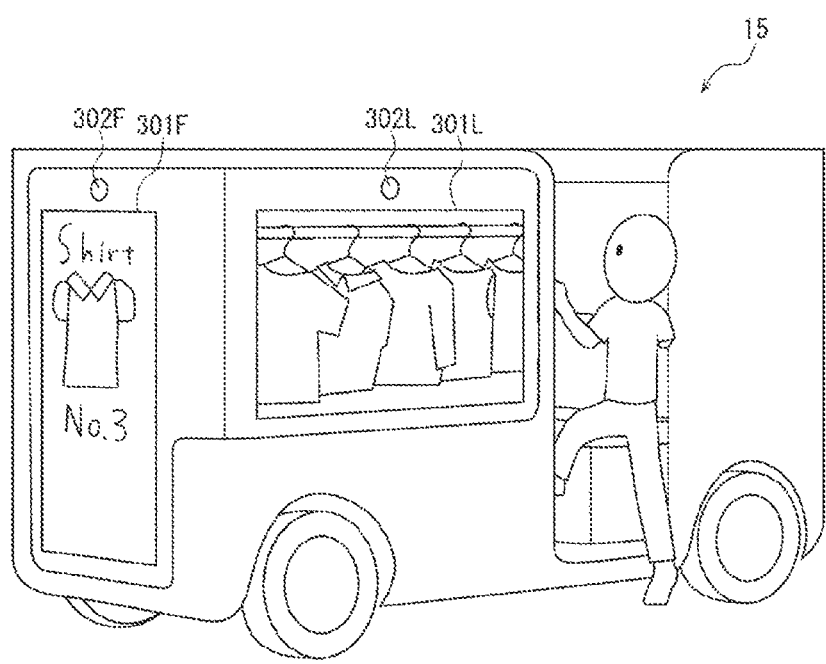
FIG. 13 is a diagram illustrating a display example when a user boards the cart.

FIG. 13 illustrates an aspect in which the user boards the cart 15. At this time, for example, an image of the item selected by the user is displayed on the display unit 301F.

In step S63, the cart 15 performs in-vehicle reception processing. Thereafter, the reception processing ends.

Figure 14:
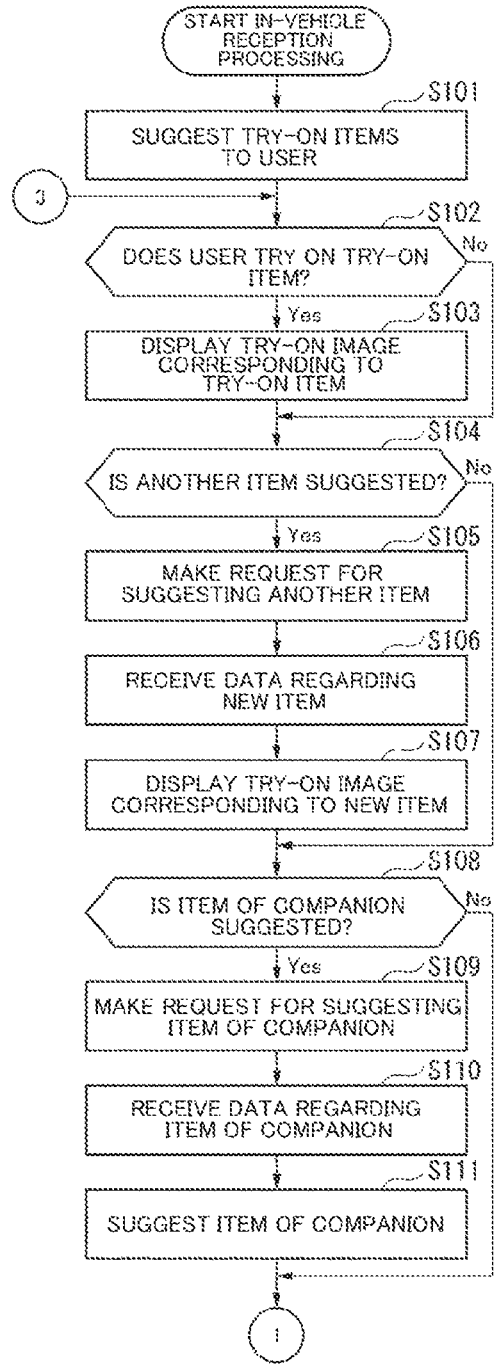
FIG. 14 is a flowchart illustrating details of in-vehicle reception processing.
Figure 15:
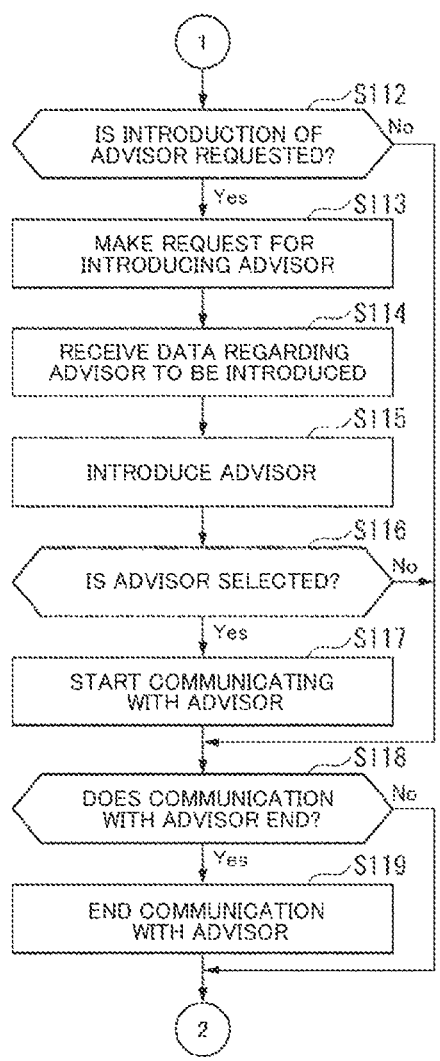
FIG. 15 is a flowchart illustrating details of the in-vehicle reception processing.
Figure 16:
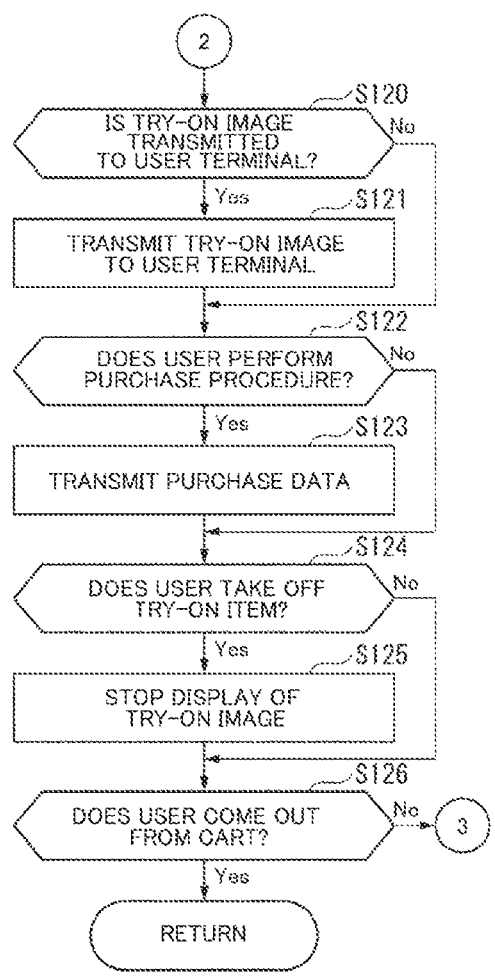
FIG. 16 is a flowchart illustrating details of the in-vehicle reception processing.

Here, details of the in-vehicle reception processing will be described with reference to FIGS. 14 to 16.

In step S101, the cart 15 suggests a try-on item to the user.

For example, the try-on item corresponding to each item handled by the owner of the cart 15 is put a try-on space inside the cart 15.

The try-on item basically has the same shape and material as an item that is actually sold, but is considered to be a colorless and plain item. In this way, by limiting the try-on item to the colorless and plain item, it is possible to reduce the number of try-on items equipped in the cart 15.

Here, the space inside the cart 15 is limited. Therefore, although the item is limited to the colorless and plain item, try-on items corresponding to all the kinds of items and the sizes of the items may not necessarily be kept. Accordingly, for example, try-on items common to items with similar shapes and sizes are prepared.

Figure 17:
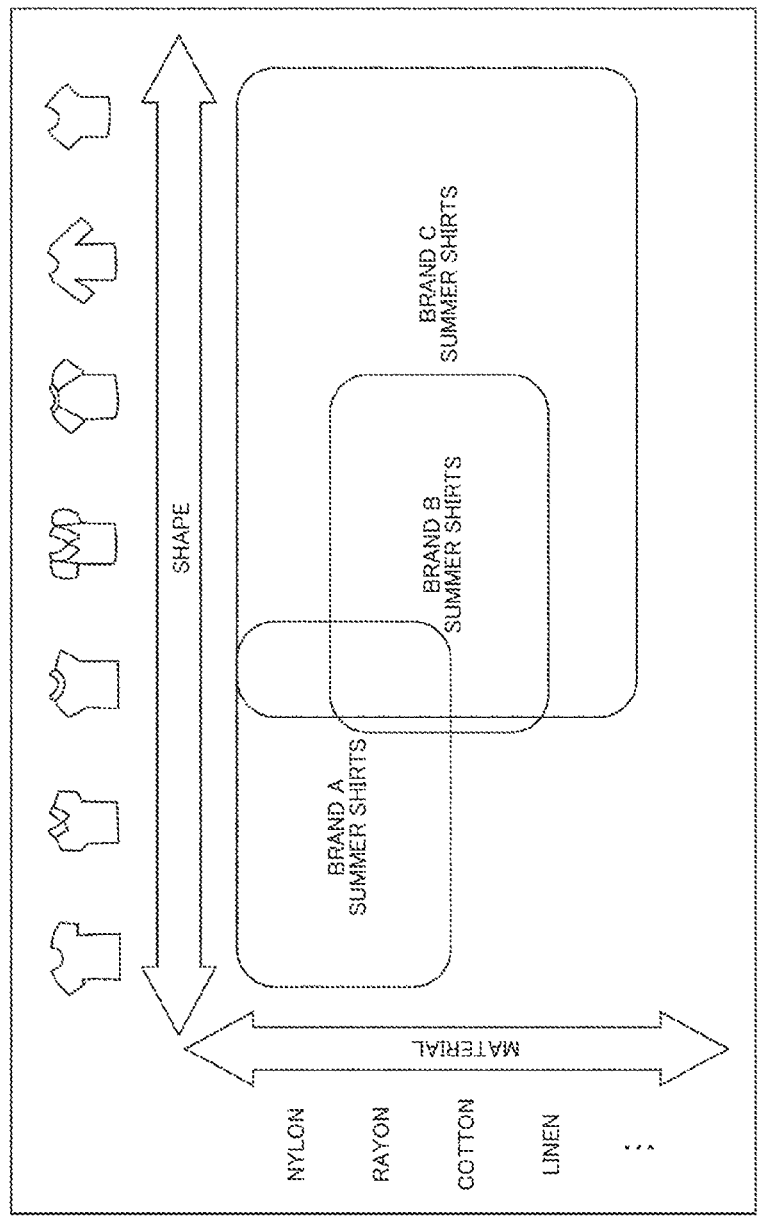
FIG. 17 is a diagram illustrating an example of a method of arranging try-on items.

FIG. 17 illustrates an example of a method of arranging try-on items.

FIG. 17 illustrates an example of a distribution of kinds of summer shirts of brands A to C. In this example, the shirts are classified on two shape and material axes.

For example, in the shape axis direction, shirts are arranged so that the shirts are closer as a difference between shapes is smaller, and are more distant as the difference between shapes is larger. The difference in the shape is defined by, for example, a difference in a shape such as a collar or a sleeve.

For example, in the material axis direction, shirts are arranged so that the shirts are closer as a difference in a wearing feeling or a touch feeling is smaller, and are more distant as the difference in the difference in the wearing feeling or the touch feeling is larger. The difference in a wearing feeling or a touch feeling is defined by, for example, a difference in a touch feeling, softness, or the like of a material.

For example, in a distribution diagram of FIG. 17, a common try-on item is prepared for mutually close shirts although brands of the shirts are different. For example, try-on items for round-neck, V-neck, and wide-neck T shirts are arranged to one item.

For example, the try-on item selection unit 466 selects a size of a try-on item based on the body shape of the user and the reference of the size of the user. For example, when a past purchase history of the user is acquired, the try-on item selection unit 466 may select a size of the item purchased by the user in the past. The try-on item selection unit 466 selects a try-on item that has a shape and a material closest to the shape and material of the item selected by the user and has the selected size as a try-on item to be suggested to the user.

The suggestion control unit 467 controls the output unit 418 such that the selected try-on item is suggested to the user. At this time, the suggestion control unit 467 causes the user to easily identify the selected try-on item.

Figure 18:
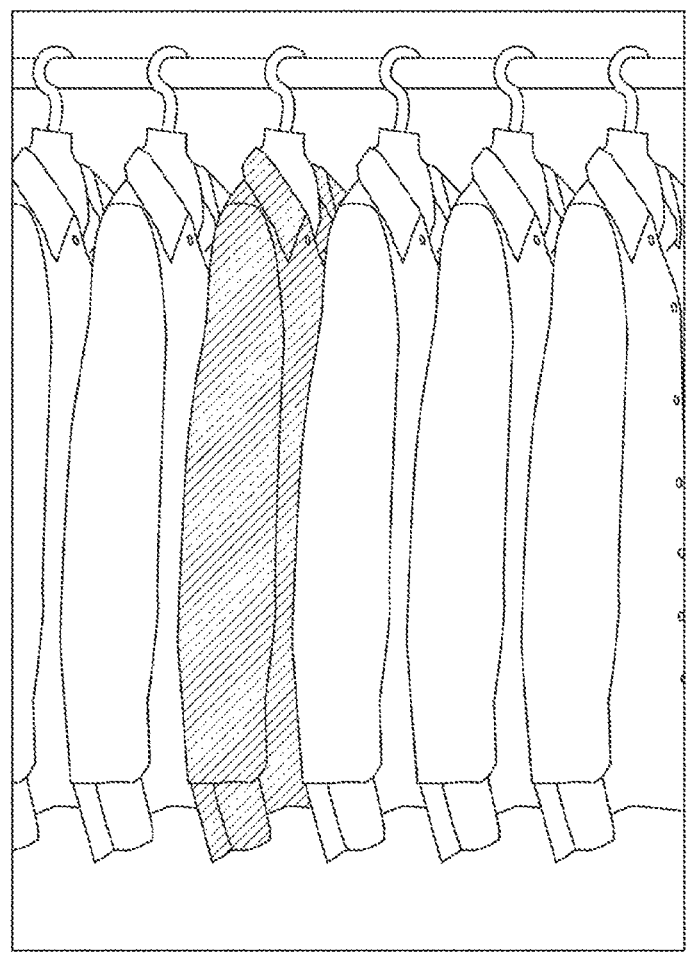
FIG. 18 is a diagram illustrating a method of suggesting try-on items.

For example, as illustrated in FIG. 18, when a try-on item indicated by diagonal lines is selected among a plurality of try-on items hung inside the cart 15, the suggestion control unit 467 controls the output unit 418 such that the selected try-on item is spotlighted.

For example, the suggestion control unit 467 physically moves the selected try-on item to a conspicuous position using a machine, a robot, or the like.

Further, for example, a different ID is assigned in advance to each try-on item and the suggestion control unit 467 controls the output unit 418 such that the ID of the selected try-on item is displayed or notified of by a sound.

Thus, the user can easily discriminate the selected try-on item from the other try-on items. As a result, the user can try on the try-on item quickly. The user is prevented from trying on a wrong try-on item.

In step S102, the observation unit 462 determines whether the user tries on the try-on item. When it is determined that the user tries on the try-on item, the processing proceeds to step S103.

In step S103, the cart 15 displays a try-on image corresponding to the try-on item. That is, the cart 15 displays the try-on image in which the user tries on the selected item using an AR technology.

For example, the image processing unit 463 superimposes the image of the selected item on the user in an image obtained by imaging the user with an in-vehicle camera. For example, the image processing unit 463 superimposes a design (color, a pattern, or the like) of the selected item on the try-on item in the image. When the shape of selected item is different from the shape of the try-on item, the image processing unit 463 corrects, for example, the shape of the image of the try-on item to conform with the shape of an actual item.

Further, the image processing unit 463 superimposes the image conforming with the selected item on a background as necessary. For example, an image indicating a situation in which the selected item is tried on or an image suitable for the atmosphere of the selected item is displayed on the background of the image in which the user wears the item.

In this way, the try-on image corresponding to the try-on item is generated.

The in-vehicle display unit displays the try-on image under the control of the display control unit 464.

The try-on image is considered to be a moving image. In the try-on image, an item superimposed on the user follows a motion of the user in real time.

Figure 19:
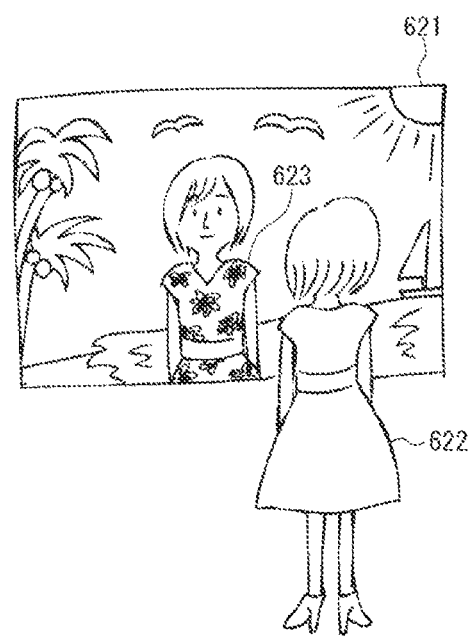
FIG. 19 is a diagram illustrating a display example of a try-on image inside the vehicle.

FIG. 19 illustrates an example of a try-on image displayed through this processing.

In this example, a try-on image is displayed on an in-vehicle display unit 621. An item 623 in which the design of the item selected by the user is superimposed on a colorless and plain try-on item 622 tried on by the user is displayed in the try-on image.

In the try-on image, a background suitable for the item 623 is superimposed. In this example, a background of a seaside resort suitable for the item 623 which is a summer one-piece dress is superimposed.

For example, when an item virtually tried on in the try-on image is a T shirt and an item which is virtually tried on and in which an image of a landscape of a city in summer is superimposed on the background is a suit, an image of an office street is superimposed on the background.

A mark (marker) may be assigned to the actual try-on item. The image processing unit 463 may superimpose the image of the selected item so that the image of the selected item is suitable for the mark of the try-on item in the image. Thus, in the try-on image, the image of the item is superimposed at an appropriate position and smoothly follows a motion of the user.

Further, a screen of the display unit 621 is preferably as large as possible. For example, the size of the screen of the display unit 621 is set to a size that allows the life-sized whole body of the user to be checked in life size instead of a mirror.

In this way, when the user tries on the try-on item, the user can actually feel a bodily sensation of a wearing feeling or a touch feeling of the selected item (for example, texture, softness, a size feeling, a tactile feeling, or the like). The user can visually check a state in which the user wears the selected item. Further, the user can virtually check an atmosphere or the like of the item in a situation in which the user wears the item.

Figure 20:
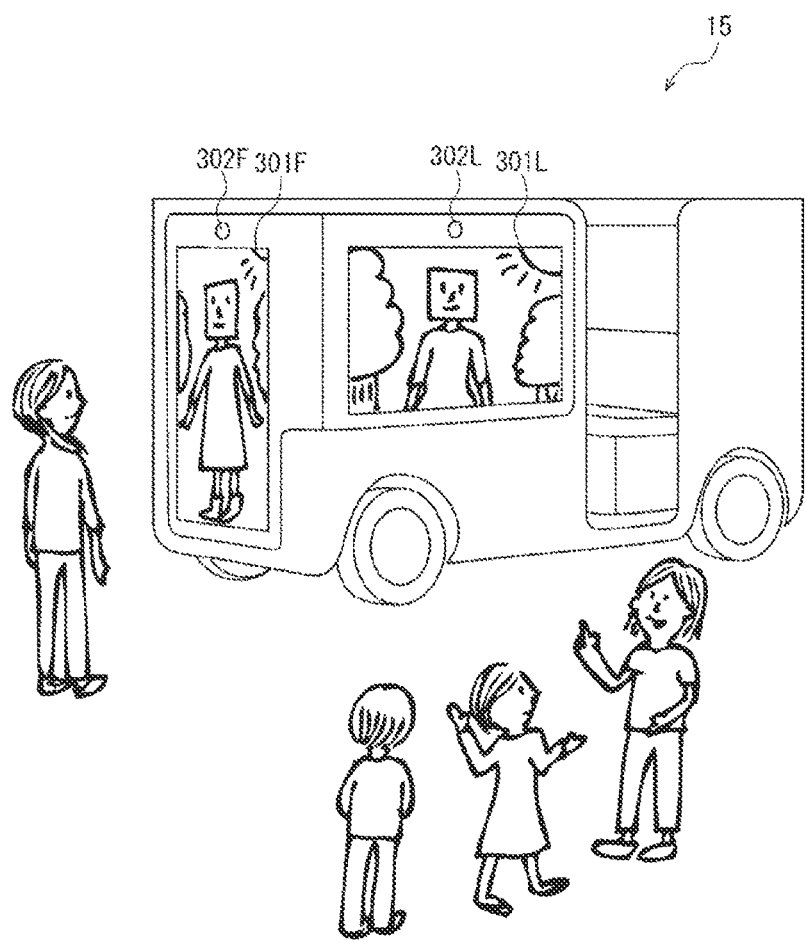
FIG. 20 is a diagram illustrating an example in which a try-on image in the vehicle is displayed outside of the vehicle.

For example, as illustrated in FIG. 20, a try-on image may be displayed outside of the cart. In this example, the try-on image is displayed on the display unit 301F and the display unit 301L outside of the cart 15.

Thus, for example, when there is a companion of the user, an aspect in which the user tries on the item can be delivered to the companion waiting outside of the cart 15. By showing the aspect of the inside of the cart 15, it is possible to give a sense of security to the companion.

For example, the user inside the cart can talk with the companion outside using a microphone and a speaker provided inside the cart 15 and a microphone and a speaker provided outside of the cart 15. Thus, for example, the user and the companion can exchange an opinion, a thought, or the like on the item which the user is trying on.

Further, by displaying a try-on image outside of the cart, it is possible to attract an interest of people around the cart 15, and thus it is possible to obtain an advertisement effect.

For example, to protect privacy of the user in the try-on image displayed outside of the cart 15, the face of the user may be hidden or may be substituted with an image of another face, an animation, or the like.

Thereafter, the processing proceeds to step S104.

Conversely, when it is determined in step S102 that the user does not try on the try-on item, that is, the user remains trying the try-on item, or when the user does not try on the try-on item, the processing of step S103 is skipped and the processing proceeds to step S104.

In step S104, the UI control unit 461 determines whether another item is suggested. When it is determined that the other item is suggested, the processing proceeds to step S105.

For example, when the observation unit 462 detects an aspect in which the user hesitates or is not satisfied, the UI control unit 461 determines that the other item is suggested.

For example, when the user inputs an instruction to suggest the other item via the input unit 417, the UI control unit 461 determines that the other item is suggested. At this time, for example, the user may input a desired condition of an item to be newly suggested.

In step S105, the cart 15 makes a request for suggesting another item.

Specifically, the UI control unit 461 generates item suggestion request data to makes the request for suggesting the other item. The communication unit 419 transmits the item suggestion request data to the server 11 under the control of the communication control unit 469.

The item suggestion request data includes, for example, a desired condition of the user for the item to be newly suggested and observation data of the user.

For example, the observation data includes a response of the user to a try-on image (an item in the try-on image) and data indicating the response of the user to the try-on item. For example, the observation data includes a display time (a try-on time) of each item in the try-on image and data indicating a response (for example, a positive or negative response) to each item. The observation data includes, for example, a portion which the user is anxious for the try-on item (for example, a part of a cloth (a collar, a sleeve, or the like), silhouette, color, pattern, or the like) and data indicating items compared by the user.

On the other hand, the server 11 receives the item suggestion request data in step S215 of FIG. 22 to be described below and selects an item to be newly suggested in step S216. In step S217, the server 11 generates selected item data of the selected item and transmits the selected item data.

In step S106, the cart 15 receives the data regarding the new item. That is, the image processing unit 463 receives the selected item data transmitted from the server 11 via the network 31 and the communication unit 419.

In step S107, the cart 15 displays a try-on image corresponding to the new item. For example, in the same processing as that of step S102, the try-on image in which the user tries on the item suggested from the server 11 is displayed on the display unit 621 or the like using an AR technology.

For example, in the try-on image, an image of the user in which the item suggested by the server 11 is superimposed is displayed in a row on the side of the image of the user in which the item selected by the user is superimposed. The image of each user may be moved to follow an actual motion of the user.

For example, when a plurality of items are suggested by the server 11, a plurality of images of the user in which each item is individually superimposed in the try-on image are similarly displayed in a row. The image of each user may be moved to follow an actual motion of the user.

Thus, the user can compare the plurality of items simultaneously and can easily select the item.

For example, when the server 11 suggests an item coordinated with an item virtually worn in the try-on image by the user, a try-on image including an image in which the suggested item is superimposed on the user is generated and displayed in addition to the item tried on by the user. For example, when pants suitable for a shirt virtually tried on by the user are suggested, a try-on image including an image in which the shirt and the pants are superimposed on the user is generated and displayed.

Thus, the user can easily select an appropriate coordination.

The item which is coordinated at this time may include a fashion item such as a bag or an umbrella different from a type of item tried on by the user.

Thereafter, the processing proceeds to step S108.

Conversely, when it is determined in step S104 that another item is not suggested, the processing of steps S105 to S107 is skipped and the processing proceeds to step S108.

In step S108, the UI control unit 461 determines whether an item of the companion is suggested. When it is determined that the item of the companion is suggested, the processing proceeds to step S109.

For example, when there is the companion of the user and the try-on image of the user is displayed, it is determined that the item of the companion is suggested.

In step S109, the cart 15 makes a request for suggesting the item of the companion. Specifically, the UI control unit 461 generates companion item request data to make a request for suggesting the item of the companion. The communication unit 419 transmits the companion item request data to the server 11 under the control of the communication control unit 469.

On the other hand, the server 11 receives the companion item request data in step S218 of FIG. 22 to be described below and selects an item to be suggested to the companion in step S219. In step S220, the server 11 transmits the selected item data regarding the selected item.

In step S110, the cart 15 receives data regarding the item of the companion. That is, the image processing unit 463 receives the selected item data transmitted from the server 11 via the network 31 and the communication unit 419.

In step S111, the cart 15 suggests the item of the companion.

For example, the image processing unit 463 generates a try-on image in which the image on which the item is superimposed on the user and the image in which the item included in the selected item data is superimpose on the companion are arranged. For example, the display units 301F to 301B and the display unit 621 displays the try-on image under the control of the UI control unit 461.

Thus, for example, an item of the companion coordinated with the item virtually tried on by the user in the try-on image is suggested.

Thereafter, the processing proceeds to step S112.

Conversely, when it is determined in step S108 that the item of the companion is not suggested, the processing of steps S109 to S111 is skipped and the processing proceeds to step S112.

In step S112, the UI control unit 461 suggests whether an introduction of an advisor is requested.

For example, when the user wants to consult the advisor about the selection, the coordination, or the like of an item, the user inputs an instruction to introduce the advisor via the input unit 417. Then, the UI control unit 461 determines that the introduction of the advisor is requested and the processing proceeds to step S113.

In step S113, the cart 15 makes a request for introducing an advisor. Specifically, the UI control unit 461 generates advisor introduction request data to make the request for introducing the advisor. The communication unit 419 transmits the advisor introduction request data to the server 11 via the network 31.

On the other hand, the server 11 receives the advisor introduction request data in step S221 of FIG. 22 to be described below and selects the advisor to be introduced in step S222. In step S223, the server 11 transmits advisor introduction data including data regarding the selected advisor to the cart 15.

The advisor introduction data includes, for example, a profile and a face photo, a fashion field good, and a self-appeal of the advisor. The profile of the advisor includes, for example, a name, an age, a gender, a vocation, nationality, a workplace (for example, a seller for whom they work), contact information, and available languages. The number of advisors included in the advisor introduction data may be one person or a plurality of people.

In step S114, the UI control unit 461 receives the data regarding the advisor to be introduced. That is, the UI control unit 461 receives the advisor introduction data transmitted from the server 11 via the network 31 and the communication unit 419.

In step S115, the cart 15 introduces the advisor. Specifically, for example, a display unit (for example, the display unit 621) in the cart 15 displays data regarding the advisor included in the advisor introduction data under the control of the display control unit 464.

In step S116, the UI control unit 461 determines whether the advisor is selected. For example, when the user performs an operation of selecting the introduced advisor via the input unit 417, the UI control unit 461 determines that the advisor is selected and the processing proceeds to step S117.

Thus, for example, when one advisor is introduced, the advisor is selected. When two or more advisors are introduced, a desired advisor is selected from them.

In step S117, the cart 15 starts communicating with the advisor. Specifically, the communication unit 419 starts communicating with the advisor terminal 14 of the selected advisor via the network 31 under the control of the communication control unit 469.

For example, the communication unit 419 starts transmitting an image and a sound of the user to the advisor terminal 14 and starts receiving an image and a sound of the advisor from the advisor terminal 14 under the control of the communication control unit 469. Thus, the user and the advisor start telecommunication using the mutual images and voice.

Then, the user can consult with the advisor about fashion. As a result, the user can select an appropriate item.

Thereafter, the processing proceeds to step S118.

Converse, when it is determined in step S116 that the advisor is not selected, the processing of step S117 is skipped and the processing proceeds to step S118.

When it is determined in step S112 that the introduction of the advisor is not requested, the processing of steps S113 to S117 is skipped and the processing proceeds to step S118.

In step S118, the UI control unit 461 determines whether the communication with the advisor ends.

For example, when the user performs an operation of ending the communication with the advisor via the input unit 417, the UI control unit 461 determines that the communication with the advisor ends and the processing proceeds to step S119.

For example, when the advisor inputs an instruction to end the communication to the advisor terminal 14 and the UI control unit 461 receives data for notifying of the end of the communication from the advisor terminal 14 via the network 31 and the communication unit 419, it is determined that the communication with the advisor ends and the processing proceeds to step S119.

In step S119, the cart 15 ends the communication with the advisor. That is, the communication unit 419 disconnects the communication with the advisor terminal 14 of the advisor performing the communication under the control of the communication control unit 469.

Thereafter, the processing proceeds to step S120.

Conversely, when it is determined in step S118 that the communication with the advisor does not end, the processing of step S119 is skipped and the processing proceeds to step S120. Although the communication with the advisor is not performed, the processing of step S119 is skipped and the processing proceeds to step S120.

In step S120, the communication control unit 469 determines whether the try-on image is transmitted to the user terminal 16. For example, when the user wants to transmit the try-on image displayed on the display unit in the cart 15 to the own user terminal 16, the user inputs an instruction to transmit the try-on image via the input unit 417. On the other hand, the communication control unit 469 determines that the try-on image is transmitted to the user terminal 16, the processing proceeds to step S121.

In step S121, the cart 15 transmits the try-on image to the user terminal 16. Specifically, the communication unit 419 transmits the try-on image to the user terminal 16 of the user under the control of the communication control unit 469.

Thereafter, the processing proceeds to step S122.

Conversely, when it is determined in step S120 that the try-on image is not transmitted to the user terminal 16, the processing of step S121 is skipped and the processing proceeds to step S122.

In step S122, the UI control unit 461 determines whether the user performs a purchase procedure. For example, when the user purchases an item, the user performs the purchase procedure via the input unit 417. On the other hand, the UI control unit 461 determines that the user performs the purchase procedure and the processing proceeds to step S123.

In step S123, the cart 15 transmits purchase data. Specifically, the UI control unit 461 generates the purchase data for purchasing the item. The communication unit 419 transmits the purchase data to the server 11 under the control of the communication control unit 469.

The purchase data includes, for example, identification information of the user, information indicating an item to be purchased, a settlement method, an item delivery destination, and a delivery method.

Thereafter, the processing proceeds to step S124.

Conversely, when it is determined in step S122 that the user does not perform the purchase procedure, the processing of step S123 is skipped and the processing proceeds to step S124.

In step S124, the observation unit 462 determines whether the user takes off the try-on item. When it is determined that the user takes off the try-on item, the processing proceeds to step S125.

In step S125, the output unit 418 stops the display of the try-on image under the control of the UI control unit 461.

Thereafter, the processing proceeds to step S126.

After the user takes off the try-on item, the display of the try-on image may continue.

Conversely, when it is determined in step S124 that the user does not take off the try-on item, the processing of step S125 is skipped and the processing proceeds to step S126. This includes a case in which the user does not try on the try-on item.

In step S126, the observation unit 462 determines that the user comes out from the cart. When it is determined that the user comes out from the cart, the processing proceeds to step S102.

Thereafter, in step S126, until it is determined that the user comes out from the cart, the processing of steps S102 to S126 is repeatedly performed.

Thus, the user can virtually try on various items in the try-on images and select a preferred item while comparing the items. When there is a companion, the user can select a preferred item while also checking coordination with the companion.

The user exchanges the try-on image as necessary.

For example, when the user reselects an item, a try-on item corresponding to the reselected item is suggested to the user through the same processing as that of step S101. For example, when a new item is suggested from the server 11, the try-on item corresponding to the new item is suggested to the user through the same processing as that of step S101 as necessary.

Then, the user can check a wearing feeling, a tactile feeling, or the like of the new item by trying on the suggested try-on item.

Conversely, when it is determined in step S126 that the user comes out from the cart, the in-vehicle reception processing ends.

Referring back to FIG. 8, in step S11, the observation unit 462 ends the observation of the user.

In step S12, the cart 15 transmits the observation data of the user. Specifically, the observation unit 462 generates observation data including a response of the user to each try-on image (an item in the try-on image) displayed for the user and a response of the user to each try-on item tried on by the user. The communication unit 419 transmits the observation data to the server 11 under the control of the communication control unit 469.

In step S13, the cart 15 notifies the server 11 of end of the reception. Specifically, the UI control unit 461 generates a reception end notification signal to notify the end of the reception. The communication unit 419 transmits the reception end notification signal to the server 11 via the network 31 under the control of the communication control unit 469.

Thereafter, the processing returns to step S1 and processing subsequent to step S1 is performed.

<Processing of Server 11>

Figure 23:
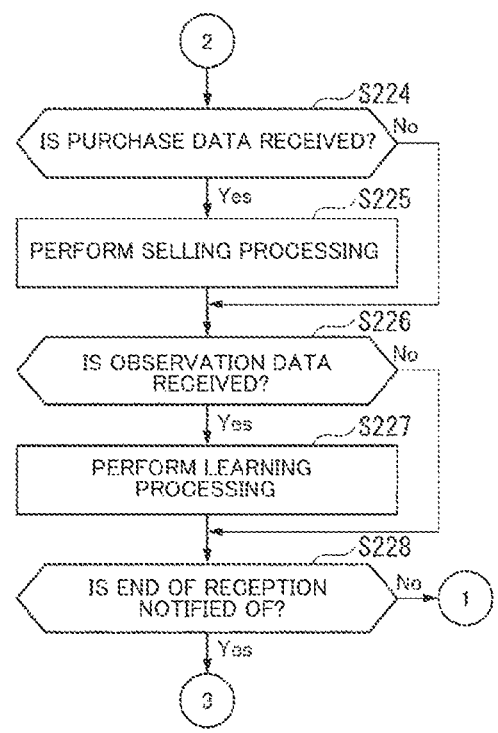
FIG. 23 is a flowchart illustrating the processing of the server.

Next, processing performed by the server 11 to correspond to the processing of the cart 15 in FIG. 8 will be described with reference to the flowcharts of FIGS. 21 to 23.

In step S201, the electronic commerce unit 164 determines whether start of reception is notified of. A determination processing of step S201 is repeatedly performed until it is determined that the start of the reception is notified of. When the reception start notification signal transmitted from the cart 15 in the processing of step S3 of FIG. 8, as described above, is received via the network 31 and the communication unit 118, the electronic commerce unit 164 determines that the start of the reception is notified of and the processing proceeds to step S202.

In step S202, the authentication unit 161 determines whether the authentication data of the user is received. When the cart 15 transmits the authentication data of the user in the processing of step S6 in FIG. 8, as described above, the authentication unit 161 receives the authentication data via the network 31 and the communication unit 118. When the authentication unit 161 determines that the authentication data of the user is received, the processing proceeds to step S203.

In step S203, the authentication unit 161 performs user authentication. For example, the authentication unit 161 compares the authentication data acquired from the cart 15 with the authentication data of each user stored in the user DB 12.

In step S204, the authentication unit 161 determines whether the user authentication is successful. When the authentication data matching the authentication data acquired from the cart 15 is detected in the user DB 12, the authentication unit 161 determines that the user authentication is successful and the processing proceeds to step S205.

In step S205, the authentication unit 161 acquires the user information. That is, the authentication unit 161 acquires the user information of the user of which the authentication is successful from the user DB 12.

Thereafter, the processing proceeds to step S206.

Conversely, when it is determined in step S204 that the authentication data matching the authentication data acquired from the cart 15 cannot detected in the user DB 12, the authentication unit 161 determines that the user authentication fails, the processing of step S205 is skipped, and the processing proceeds to step S206.

When it is determined in step S202 that the authentication data of the user is not received, the processing of steps S203 to S205 is skipped and the processing proceeds to step S206.

In step S206, the feature recognition unit 162 recognizes that features of the outer appearance of the user. Specifically, the feature recognition unit 162 receives the image of the user transmitted from the cart 15 in the processing of step S7 in FIG. 8, as described above, via the network 31 and the communication unit 118. Then, the feature recognition unit 162 recognizes the features of the outer appearance of the user based on the image of the user.

The features of the outer appearance of the user include, for example, the body shape of the user, facial features, a hairstyle, a hair color, a skin color, the shape of a beard (in the male case), a skin color, a dress, accessories and glasses worn on a body, and a makeup state.

Figure 24:
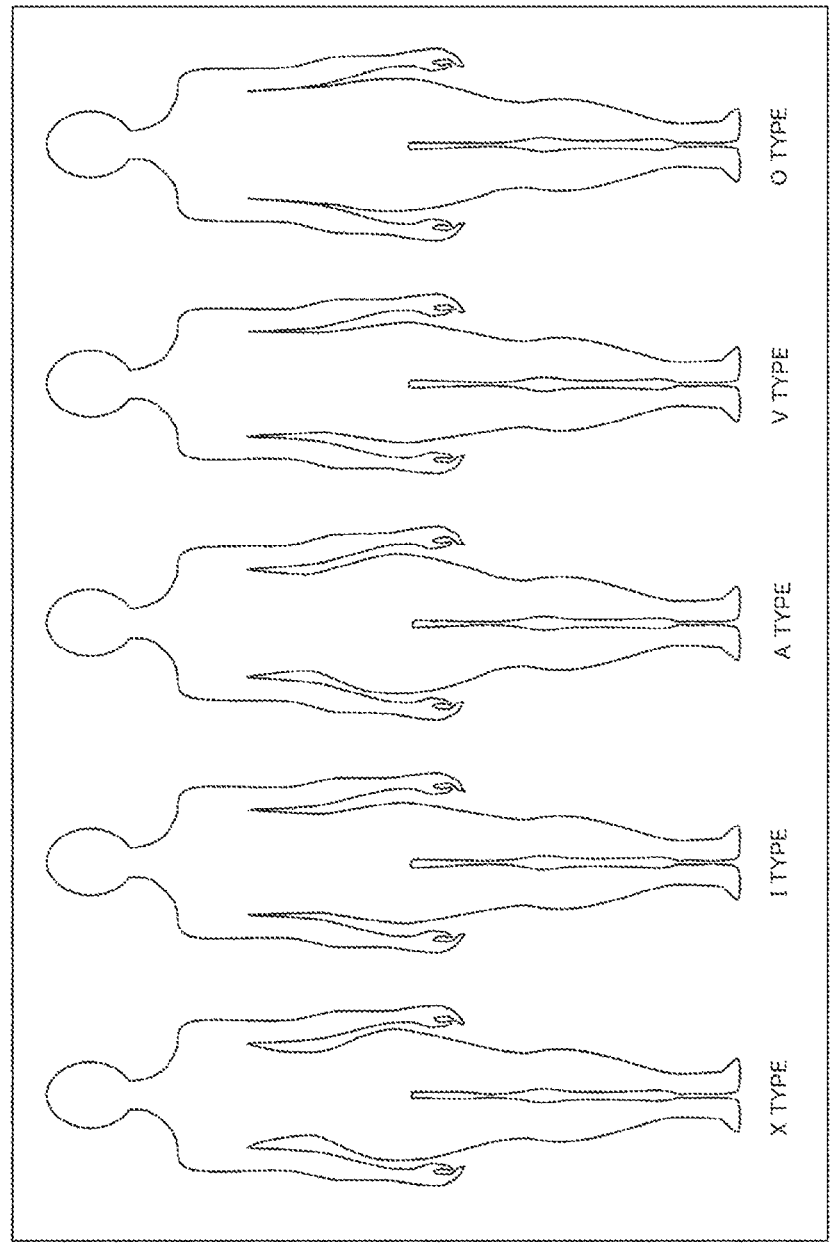
FIG. 24 is a diagram illustrating an example of a method of classifying body shapes of users.

FIG. 24 illustrates a classification example of the body shapes of users. In this example, body shapes of users are classified into five body shapes of an X type, an I type, an A type, a V type, and an O type. The X shape is a glamorous body shape. The I shape is a slender body shape. The A shape is a body shape in which the lower part of the body is fat. The V shape is an inverted triangular body shape. The O shape is a chubby body shape.

A method of classifying body shapes of users is not limited to the example of FIG. 24 and any method can be set.

The feature recognition unit 162 may also consider information (for example, a height, a weight, a size of each part of the body, or the like) included in the user information and recognize features of the outer appearance of the user when the user information of the user is acquired.

In step S207, the item selection unit 171 selects a type of fashion to be suggested to the user. Specifically, the item selection unit 171 selects a type suitable for the user among a plurality of kinds of fashion types based on the outer appearance of the user.

Figure 25A:
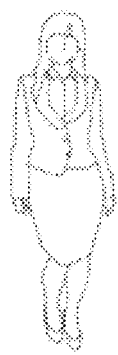
FIGS. 25A, 25B, 25C, 25D, and 25E are diagrams illustrating an example of a method of classifying types of fashion.
Figure 25B:
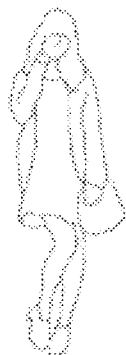
Figure 25C:
Figure 25D:
Figure 25E:
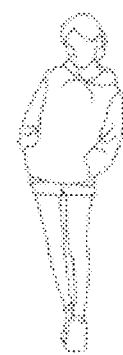

FIGS. 25A, 25B, 25C, 25D, and 25E illustrate examples of fashion types. FIG. 25A shows an example of a business type which is a fashion in which a user mainly wears in a business place. FIG. 25B shows an example of a feminine type which is a fashion in which a user is conscious of femininity. FIG. 25C shows an example of a casual type which is a fashion of casually conformable style. FIG. 25D shows an example of a street type which is a fashion naturally occurring from the young in streets. FIG. 25E shows an example of a sporty type which is a fashion in which rough movement is easier than in the casual type.

Any method of classifying types of fashion can be set.

When the user information is acquired, the item selection unit 171 may causes the user to select a type of fashion to be suggested to the user in consideration of preference of the user included in the user information.

When a type of fashion suitable for the user does not match a type of fashion preferred by the user, for example, the item selection unit 171 selects one of the types of fashion or selects an intermediate type of both the types of fashions.

In step S208, the feature recognition unit 162 determines whether the image of the companion is received. When the cart 15 transmits the image of the companion of the user in the processing of step S9 of FIG. 8, as described above, the feature recognition unit 162 receives the image of the companion via the network 31 and the communication unit 118. Then, the feature recognition unit 162 determines that the image of the companion is received, and the processing proceeds to step S209.

In step S209, the feature recognition unit 162 recognizes the features of the outer appearance of the companion based on the image of the companion in the same processing as that of step S207.

Thereafter, the processing proceeds to step S210.

Conversely, when it is determined in step S208 that the image of the companion is not received, the processing of step S209 is skipped and the processing proceeds to step S210.

In step S210, the item selection unit 171 selects an item exhibited outside of the cart 15. Specifically, the item selection unit 171 selects the item to be exhibited with a focus on a fashion type of item selected in the processing of step S207 among the items handled by the owner of the cart 15.

For example, when the business type is selected in the example of FIGS. 25A, 25B, 25C, 25D, and 25E, as described above, a formal item appropriate for a business scene is mainly selected. When the feminine type is selected, an item emphasizing femininity is mainly selected. When the casual type is selected, an item of a casual apparel is mainly selected. When the street type is selected, an item popular in streets among the young at present is mainly selected. When the sporty type is selected, a rough and easy-to-move item including a sport wear is mainly selected.

For example, the item selection unit 171 may select an item suitable for the user or select an item preferred by the user based on the features of the outer appearance of the user without determining a type of fashion. For example, the item selection unit 171 may select an item recommended by the owner of the cart 15, for example, an item on which the owner of the cart 15 makes an effort for promotion.

In step S211, the server 11 transmits data regarding the selected item. Specifically, the item selection unit 171 generates selected item data regarding the selected item. The communication unit 118 transmits the selected item data to the cart 15 via the network 31 under the control of the communication control unit 166.

In step S212, the item selection unit 171 determines whether a change in the items exhibited outside of the cart 15 is requested. When the item change request data transmitted from the cart 15 in the processing of step S54 of FIG. 10, as described above, is received, the item selection unit 171 determines that the change in the items exhibited outside of the cart 15 is requested and the processing proceeds to step S213.

In step S213, the item selection unit 171 reselects items to be exhibited outside of the cart 15.

For example, when the item change request data includes a desired condition of the user, the item selection unit 171 reselects the items to be exhibited based on the desired condition of the user.

When the item change request data does not include the desired condition of the user, for example, the item selection unit 171 changes the types of fashion to be suggested to the user. For example, the item selection unit 171 selects types of candidates after the currently selected types of fashion or changes a selection condition and reselects types. Then, the item selection unit 171 reselects items to be exhibited based on the changed types of fashion.

In step S214, data regarding the selected items is transmitted similarly to the processing of step S211.

Thereafter, the processing proceeds to step S215.

Conversely, when it is determined in step S212 that the change in the items exhibited outside of the cart 15 is not requested, the processing of steps S213 and S214 is skipped and the processing proceeds to step S215.

In step S215, the item selection unit 171 determines whether suggestion of other items is requested. When the item suggestion request data transmitted from the cart 15 in the processing of step S105 of FIG. 14, as described above, is received, the item selection unit 171 determines that the suggestion of the other items is requested and the processing proceeds to step S216.

In step S216, the item selection unit 171 selects items to be newly suggested.

For example, when the item suggestion request data includes the desired condition of the user, the item selection unit 171 selects the items to be newly suggested based on the desired condition of the user.

When the item suggestion request data does not include the desired condition of the user, the item selection unit 171 selects the items to be newly suggested based on types of fashion suggested to the user, observation data of the user, and preference information of the user (when acquired). For example, the item selection unit 171 selects items predicted to be preferred by the user in the types of fashion currently suggested to the user.

Further, for example, the item selection unit 171 selects other items coordinated with an item which the user virtually tries on in the try-on image at present. For example, when the user virtually tries on a shirt in a try-on image at present, the item selection unit 171 selects pants matching the shirt. The number of coordinated items may be plural.

In step S217, data regarding the selected items is transmitted similarly to the processing of step S211.

Thereafter, the processing proceeds to step S218.

Conversely, when it is determined in step S215 that the suggestion of the other items is not requested, the processing of steps S216 and S217 is skipped and the processing proceeds to step S218.

In step S218, the item selection unit 171 determines whether the suggestion of an item of the companion is requested. When the companion item request data transmitted from the cart 15 in the processing of step S109 of FIG. 14, as described above, is received, the item selection unit 171 determines that the suggestion of the item of the companion is requested and the processing proceeds to step S219.

In step S219, the item selection unit 171 selects an item to be suggested to the companion. For example, the item selection unit 171 selects an item coordinated with the item which the user virtually tries on in the current try-on image based on the features of the outer appearance of the companion. The type of item suggested to the companion may not necessarily match the type of fashion suggested to the user.

In step S220, data regarding the selected item is transmitted similarly to the processing of S211.

Thereafter, the processing proceeds to step S221.

Conversely, when it is determined in step S218 that the suggestion of the item of the companion is not requested, the processing of steps S219 and S220 is skipped and the processing proceeds to step S221.

In step S221, the advisor selection unit 172 determines whether an introduction of the advisor is requested. When the advisor introduction request data transmitted from the cart 15 in the processing of step S113 of FIG. 15, as described above, is received via the network 31 and the communication unit 118, the advisor selection unit 172 determines that the introduction of the advisor is requested and the processing proceeds to step S222.

In step S222, the advisor selection unit 172 selects an advisor to be introduced. Specifically, the advisor selection unit 172 selects the advisor to be introduced to the user among the advisors registered in the sales DB 13.

For example, when the advisor introduction request data includes the desired condition of the user, the advisor selection unit 172 selects an advisor satisfying the desired condition.

For example, when the advisor introduction request data does not include the desired condition of the user, the advisor selection unit 172 selects an advisor appropriate for the user. For example, the advisor selection unit 172 selects an advisor who is an expert of the types of fashion currently suggested to the user. Alternatively, for example, the advisor selection unit 172 selects an advisor which is well compatible with the user based on the personal information or the preference information of the user. Alternatively, the advisor selection unit 172 selects an employee of the owner of the cart 15 as an advisor.

In step S223, the server 11 transmits data regarding the selected advisor. Specifically, the advisor selection unit 172 generates the above-described advisor introduction data. The communication unit 118 transmits the advisor introduction data to the cart 15 via the network 31 under the control of the communication control unit 166.

Thereafter, the processing proceeds to step S224.

Conversely, when it is determined in step S221 that the introduction of the advisor is not requested, the processing of steps S222 and S223 is skipped and the processing proceeds to step S224.

In step S224, the electronic commerce unit 164 determines whether the purchase data is received. When the cart 15 transmits the purchase data in the processing of step S127 in FIG. 16, as described above, the electronic commerce unit 164 receives the purchase data via the network 31 and the communication unit 118. Then, the electronic commerce unit 164 determines that the purchase data is received and the processing proceeds to step S225.

In step S225, the electronic commerce unit 164 performs selling processing. For example, the electronic commerce unit 164 performs processing for sending an item purchased by the user and withdrawing money based on the purchase data.

Thereafter, the processing proceeds to step S226.

Conversely, when it is determined in step S224 that the purchase data is not received, the processing of step S225 is skipped and the processing proceeds to step S226.

In step S226, the learning unit 165 determines whether the observation data is received. When the cart 15 transmits the observation data in the processing of step S12 in FIG. 8, as described above, the learning unit 165 receives the observation data via the network 31 and the communication unit 118. Then, the learning unit 165 determines that the observation data is received and the processing proceeds to step S227.

In step S227, the learning unit 165 performs learning processing. For example, the learning unit 165 performs learning of preference of the user for the item based on the observation data. When the user purchases an item, the learning unit 165 performs learning of the preference of the user for the item based on the purchased item. The learning unit 165 updates preference information of the user stored in the sales DB 13 based on a learning result.

Thereafter, the processing proceeds to step S228.

Conversely, when it is determined in step S226 that the observation data is not received, the processing of step S227 is skipped and the processing proceeds to step S228.

In step S228, the electronic commerce unit 164 determines whether the end of the reception is notified of. When it is determined that the end of the reception is not notified of, the processing returns to step S212.

Thereafter, until it is determined in step S228 that the end of the reception is notified of, the processing of steps S212 to S228 is repeatedly performed.

Figure 8:
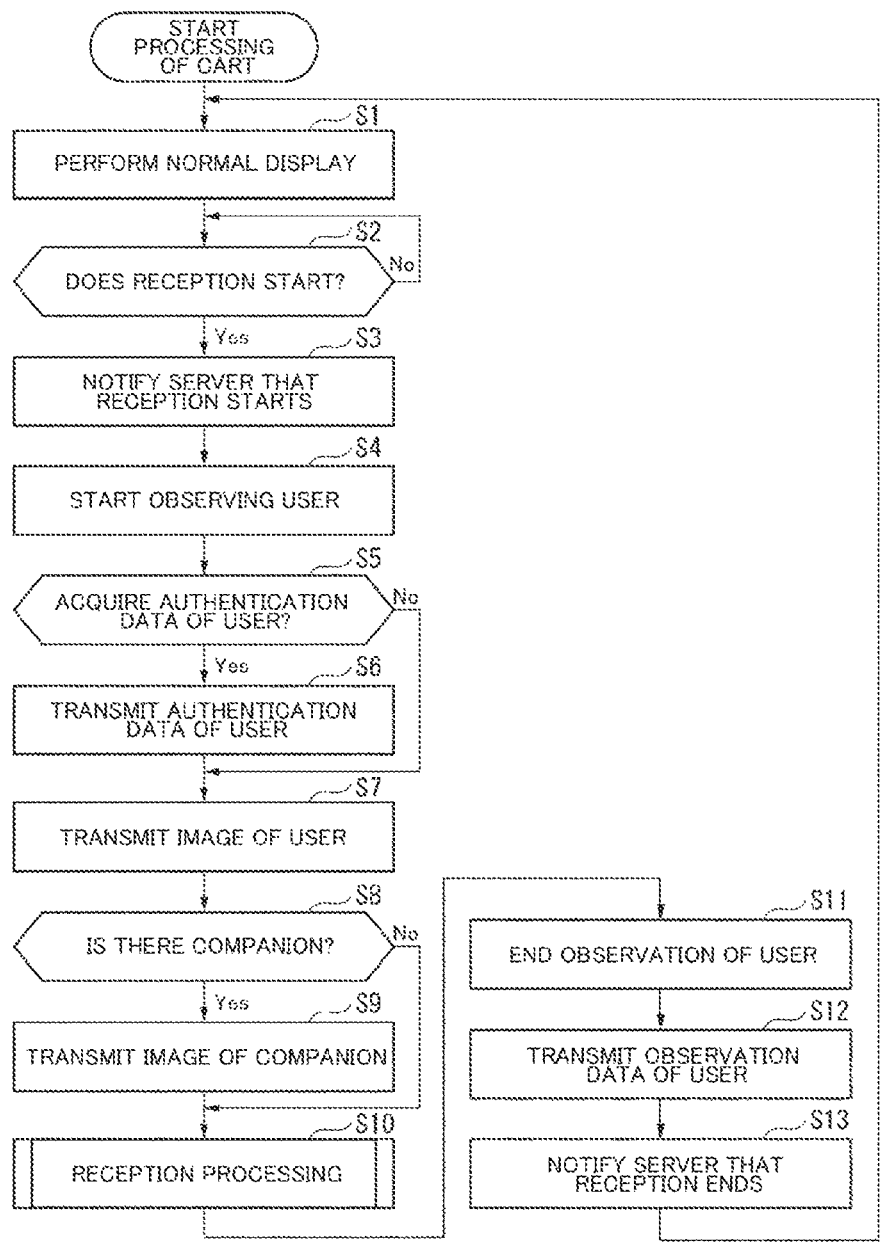
FIG. 8 is a flowchart illustrating processing of the cart.

Conversely, when the reception end notification signal transmitted from the cart 15 in the processing of step S13 of FIG. 8, as described above, is received via the network 31 and the communication unit 118 in step S228, the electronic commerce unit 164 determines that the end of the reception is notified of and the processing returns to step S201.

Thereafter, the processing subsequent to step S201 is performed.

As described above, the user can actually check a wearing feeling or a tactile feeling of the item by visually checking a wearing state of the item based on the try-on image and trying on the try-on item. As a result, the user can appropriately select the item. The item selected by the user is prevented from generating an event different from an assumed image.

Since the type of fashion or the item is suggested based on the features of the outer appearance or the preference of the user, the user can select the item more appropriately.

Further, since other items coordinated for the item tried on by the user are suggested, the user can select an appropriate fashion coordination.

Accordingly, the user can easily select an item preferred by the user, the item suitable for the user, or the sophisticated item.

For example, a seller who does not have an actual store can easily start a shop at a small fund using only the cart 15. Since it is not necessary for the seller to equip actual items in the cart 15, the inventory can be reduced.

Further, since the cart 15 can move freely, the seller can freely select a district where the seller does business. For example, the seller can increase sales by disposing the cart 15 in places where demands for various event sites or the like are high.

For example, the seller can introduce a prevalent fashion quickly or establish a fashion culture by disposing the cart 15 in a district where the number of stores is small. The user can obtain a desired item while actually checking a wearing feeling, a tactile feeling, or the like although the user does not go to a distant store.

Further, for example, the seller can also estimate an advertisement income by displaying an advertisement on the display unit outside of the cart 15.

2. MODIFIED EXAMPLES

Hereinafter, modified examples of the above-described embodiments of the present technology will be described.

<Modified Examples of Cart>

For example, in consideration of a user who is resistant to change in a space where a camera is installed, for example, a space in which the try-on item is changed and the user may be imaged and a space in which the try-on image is displayed may be partitioned.

The above-described cart 15 is exemplary and another type of cart can be used.

Figure 26:
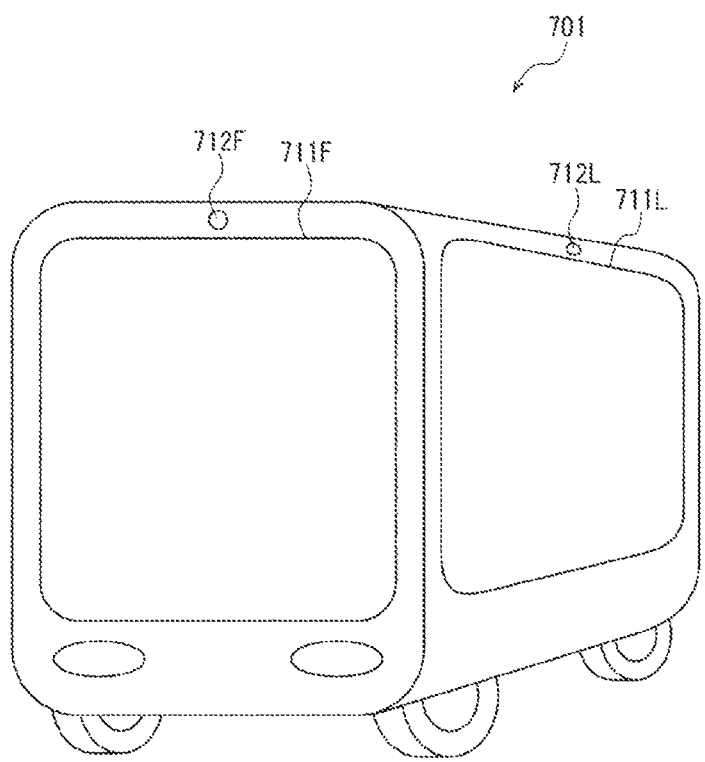
FIG. 26 is a diagram illustrating a modified example of the exterior appearance of the cart.

For example, FIG. 26 illustrates another exemplary configuration of the cart. FIG. 26 illustrates an exemplary configuration of the exterior appearance when a cart 701 is viewed from a diagonally left front.

In the cart 701, a display unit 711F, a display unit 711L, a display unit 711R (not illustrated), and a display unit 711B (not illustrated) are provided on the front surface, the left side surface, the right side surface, and the back surface of the cart 701, respectively, as in the cart 301 of FIG. 5.

A camera 712F, a camera 712L, a camera 712R (not illustrated), and a camera 712B (not illustrated) are provided on the front surface, the left side surface, the right side surface, and the back surface of the cart 701 as in the cart 301.

The cart 701 is different from the cart 701 in that the cart 701 has a completely closed space inside. Thus, privacy or security of a patient can be guaranteed more rigidly and a user can use the cart 701 more at ease.

A moving object configuring the information processing system 1 is not limited to the above-described vehicle, but another type of vehicle can also be applied.

Further, a moving object configuring the information processing system 1 is not limited to the type of vehicle, but another kind of moving object may be used.

A moving object configuring the information processing system 1 may be a type of moving object which a driver drives.

<Modified Examples of Try-On Image>

As described above, the example in which the try-on image is generated by superimposing the image of the item on the image of the user (the image of the try-on item) in the image has been described above. For example, the try-on image may be generated by imaging the user in a state in which the image of the item is projected by directly projecting the image of the item (for example, an image indicating a design of the item) to the try-on item tried on by the user using a projection mapping technology.

Figure 27:
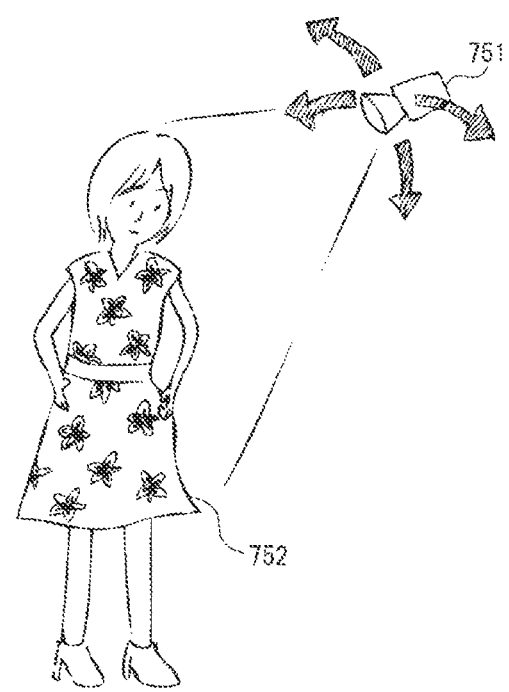
FIG. 27 is a diagram illustrating an example in which an image of an item is projected to a try-on item.

For example, as illustrated in FIG. 27, a projector 751 provided inside the cart 15 projects an image of an item to a try-on item 752 tried on by the user under the control of the projection control unit 465. Since the try-on item 752 is colorless and plain, the image of the item is projected neatly. For example, the image processing unit 463 generates a try-on image with a camera (not illustrated) based on an image obtained by imaging the user in a state in which the image of the item is projected.

For example, the plurality of projectors 751 may be provided and an image of an item may be projected to the whole try-on item 752 from a plurality of directions. Thus, for example, when an image of the item may be projected to a portion which is not seen in the try-on image of the try-on item 752, the user can check a state close to a state in which the user tries on an actual item.

Because the inside of the cart 15 is relatively dark, it is possible to obtain the advantage of clearly shining the color or the pattern of the image of the item projected to the try-on item 752.

Inside the cart 15, a space in which a user can try on a try-on item when the user stands may not necessarily be provided. In this case, for example, the image processing unit 463 may generate the try-on image using an image of the user captured when the user stands outside of the cart 15.

Further, for example, a user may order an item with preferred color by adjusting color of the try-on image.

For example, when an item to be tried on is pants, for example, the shape of the hemline of the pants in the try-on image may be changed to a straightness, a double, a roll-up, or the like. Thus, the user can visually check a state in which the hemline of the pants is processed.

A scale for hemming may be assigned to the hem of the try-on item of the pants or a scale for hemming may be superimposed and displayed on the hem of the pants in the try-on image. Thus, the user can easily ascertain an appropriate position of the hemming and perform ordering of the hemming.

Further for example, a try-on image on which an item suitable for a pedestrian passing by near the cart 15 is superimposed may be generated based on features of the outer appearance of the pedestrian and may be displayed outside of the cart 15. Thus, for example, an interest of the pedestrian can be aroused and new fashion can be suggested.

<Modified Examples of Method of Selecting Item Suggested to User>

As described above, the example in which the item to be suggested to the user is selected based on the features of the outer appearance or the preference of the user has been described. However, the item may be selected in accordance with another method.

For example, an item may be selected based on preference or a purchase history of another user with a similar body shape to the user. Thus, for example, an item suitable for the body shape of the user is selected without selecting an item worn by a model unconditionally.

For example, an item may be selected based on a purchase history of another user with to similar preference to the user.

Further, for example, an item may be selected based on preference or a purchase history of another user having an influence on the user or a celebrity liked by the user.

<Modified Examples of Item Purchasing Method>

As described above, the example in which the user purchases the item by operating the input unit 417 of the cart 15 has been described. However, for example, access to an electronic commerce (EC) site of a seller may be made to purchase an item using the user terminal 16. Thus, for example, after the user gets off the cart 15, the user can select an item while carefully comparing a difference between a plurality of items with a try-on image transmitted to the user terminal 16.

For example, the user may transmit a try-on image to the EC site and designate an item to be purchased with the try-on image.

For example, the EC site (the seller) may suggest other items suitable for the item in the try-on image based on the try-on image.

Further, for example, the seller may publicize a try-on image transmitted from each user on the EC site or the like so that the try-on image can be referred to by other users for dressing.

<Modified Examples of Allocation of Steps of Processing of Information Processing System 1>

Allocation of the steps of processing of the above-described information processing system 1 is exemplary and can be altered.

For example, some or all of the steps of processing of the server 11 may be performed by the cart 15 or the user terminal 16. For example, some of the steps of processing of the cart 15 may be performed by the server 11 or the user terminal 16.

For example, the server 11 may generate a try-on image based on an image of a user acquired from the cart 15 and transmit the try-on image to the cart 15.

For example, the cart 15 may have a function similar to that of the item selection unit 171 of the server 11. The cart 15 may select items to be suggested to a user or his or her companion.

For example, the cart 15 may have a function similar to that of the learning unit 165 of the server 11. The cart 15 may learn preference of the user.

<Modified Examples of Observation Data Using Method>

For example, the observation data may be used to estimate a demand for an item or to improve or develop an item.

For example, a seller can find out defects or points for improvement of items which have not been unpurchased by users who have tried on the items inside the cart 15 by checking responses of users to the unpurchased items or comparing the unpurchased items with purchased items. Then, the seller can improve the items or develop new items based on defects or points for improvement of the items.

Information regarding the items which have not been purchased by the users who have tried on the items is information which was not collected in the past and can be used, for example, to estimate demands of the items.

Further, the observation data may include, for example, images obtained by imaging users.

<Other Modified Examples>

For example, when the observation data or the try-on images acquired in the cart 15 are transmitted outside of the cart 15, it is preferable to keep the observation data or the try-on images confidential and transmit the observation data or the try-on images for security or privacy protection.

Information regarding a type of fashion suggested to a user, a preferred size of the user, or the like may be stored in the user DB 12 and may be used by the user after next time when the cart 15 is used. Further, instead of a user, a third party may purchase an item as a gift for the user based on the information stored in the user DB 12.

Further, the present technology can be applied to an actual store or the like fixed at a location. Then, for example, a user can check a wearing feeling, texture, or the like of an item which is not left in an actual store. For example, it is possible to reduce the number of items left on the actual store.

For example, the present technology can also be applied to a case in which a try-on item is transmitted to a home of a user and the user virtually tries on a desired item at his or her home. For example, the user may image a try-on state of a try-on item at his or her home and the server 11 or the user terminal 16 may generate and display a try-on image of the user who virtually tries on the desired item based on the captured image.

3. OTHERS

The above-described series of steps of processing may be performed by hardware or software. When the series of steps of processing is performed by software, a program of the software is installed in a computer. Here, the computer includes a computer embedded in dedicated hardware or, for example, a general-purpose computer capable of executing various functions by installing various programs.

A program executed by a computer may be recorded on, for example, a removable medium (for example, the recording medium 114 of FIG. 2, the recording medium 214 of FIG. 4, or the recording medium 414 of FIG. 6) which is a package medium for supply. The program can be supplied via a wired or wireless transfer medium such as a local area network, the Internet, or digital satellite broadcasting.

A program executed by a computer may be a program which performs processing chronologically in a sequence described in the present specification or may be a program that performs processing in parallel or at a necessary timing such as a calling.

In the present specification, the system means a set of a plurality of constituent elements (devices, modules (components), or the like) and all the constituent elements may be included or not included in the same casing. Accordingly, a plurality of devices accommodated in separate casings and connected via a network and one device in which a plurality of modules are accommodated in one casing may all be a system.

Embodiments of the present technology are not limited to the above-described embodiments and can be modified in various forms within the scope of the present technology departing from the gist of the present technology.

For example, the present technology may have a configuration of clouding computing in which a plurality of devices share and process one function together via a network.

The steps described in the above-described flowchart can be execute by one device or may be shared and performed by a plurality of devices.

Further, when a plurality of steps of processing are included in one step, the plurality of steps of processing included in the one step may be performed by one device or may be shared and performed by a plurality of devices.

<Combination Examples of Configurations>

The present technology can be configured as follows.

(1) An information processing device including:
  a display control unit configured to control display of try-on images including images in which fashion items are superimposed on a user trying on try-on items corresponding to the fashion items.

(2) The information processing device according to (1), further including:
  a suggestion control unit configured to control suggestion of the try-on items corresponding to the fashion items to the user.

(3) The information processing device according to (2), wherein the display control unit further controls display of an image of a fashion item suggested to the user, and
  wherein the suggestion control unit controls the suggestion of the try-on item corresponding to the fashion item selected among the suggested fashion items to the user.

(4) The information processing device according to (3), wherein the try-on image includes an image in which the fashion item selected from the suggested fashion items is superimposed on the user.

(5) The information processing device according to any one of (2) to (4), further including:
  an item selection unit configured to select a fashion item to be suggested to the user based on a feature of an outer appearance of the user.

(6) The information processing device according to any one of (1) to (5), wherein the display control unit causes a first display unit inside a moving object to display the try-on images.

(7) The information processing device according to (6), wherein the display control unit causes a second display unit outside of the moving object to display images of the fashion items suggested to the user.

(8) The information processing device according to (7), wherein the try-on image includes an image in which the fashion item selected from the suggested fashion items is superimposed on the user.

(9) The information processing device according to any one of (6) to (8), wherein the display control unit further causes a third display unit outside of the moving object to display the try-on images.

(10) The information processing device according to any one of (1) to (9), wherein the display control unit controls display of the try-on image including images in which another fashion item coordinated with the fashion items is superimposed on the user.

(11) The information processing device according to any one of (1) to (10), wherein the display control unit controls display of the try-on images in which a plurality of images of the user on which different fashion items are superimposed are arranged.

(12) The information processing device according to any one of (1) to (11), wherein the display control unit controls display of the try-on image further including an image of another user on which a fashion item coordinated with the fashion item of the user is superimposed.

(13) The information processing device according to any one of (1) to (12), wherein the display control unit controls display of the try-on images on which backgrounds suitable for the fashion items are further superimposed.

(14) The information processing device according to any one of (1) to (13), wherein, in the try-on images, images of the fashion items are superimposed on images of the try-on items.

(15) The information processing device according to any one of (1) to (13), wherein the try-on image includes an image obtained by imaging the user in a state in which an image of the fashion item is projected to the try-on item.

(16) The information processing device according to (15), further including:
a projection control unit configured to control the projection of the image of the fashion item to the try-on item.

(17) The information processing device according to (16), wherein the projection control unit performs control such that the image of the fashion item is projected to the whole try-on item.

(18) The information processing device according to any one of (1) to (17), further including:
an image processing unit configured to generate the try-on image.

(19) The information processing device according to (18), wherein the image processing unit superimposes the image of the fashion item on the image of the try-on item to be suitable for a mark attached to the try-on item.

(20) The information processing device according to any one of (1) to (19), further comprising:
a communication control unit configured to control transmission of the try-on image to another information processing device.

(21) The information processing device according to any one of (1) to (20), further including:
an observation unit configured to observe a response of the user to at least one of the try-on image and the try-on item and generate observation data indicating an observation result.

(22) The information processing device according to (21), further including:
a learning unit configured to learn a preference of the user based on the observation data.

(23) The information processing device according to any one of (1) to (22), wherein the try-on item is colorless and plain.

(24) The information processing device according to any one of (1) to (23),
wherein the fashion item is clothing, and
wherein the try-on item is try-on clothing.

(25) An information processing method including:
controlling display of try-on images including images in which fashion items are superimposed on a user trying on try-on items corresponding to the fashion items.

(26) A program causing a computer to perform processing for controlling display of try-on images including images in which fashion items are superimposed on a user trying on try-on items corresponding to the fashion items.

The advantageous effects described in the present specification are merely exemplary and are not limited, and other advantageous effects may be obtained.

REFERENCE SIGNS LIST

1 Information processing system
11 Server
12 User DB
13 Sales DB
14-1 to 14-$m$ Advisor terminal
15-1 to 15-$n$ Cart
16-1 to 16-$p$ User terminal
111 Processor
118 Communication unit
151 Information processing unit
161 Authentication unit
162 Feature recognition unit
163 Selection unit
164 Electronic commerce unit
165 Learning unit
166 Communication control unit
171 Item selection unit
172 Advisor selection unit
201 Information processing terminal
211 Processor
218 Communication unit
311F, 311L, 311R, 311B Display unit
312F, 312L, 312R, 312B Camera
411 Processor
418 Output unit
419 Communication unit
451 Information processing unit
461 UI control unit
462 Observation unit
463 Image processing unit
464 Display control unit
465 Projection control unit
466 Try-on item selection unit
467 Suggestion control unit
468 Movement control unit
469 Communication control unit
621 Display unit
622 Try-on item
623 Item
711 Cart
711F, 711L, 711R, 711B Display unit
712F, 712L, 712R, 712B Camera
751 Projector
752 Try-on item

The invention claimed is:
1. A first information processing device, comprising:
a central processing unit (CPU) configured to:
select a first fashion item to be suggested to a first user, wherein the selection of the first fashion item is based on a feature of an outer appearance of the first user;
control suggestion of try-on items corresponding to the selected first fashion item to the first user;

control display of try-on images including first images in which the selected first fashion item is superimposed on the first user, wherein the displayed try-on images indicate trial of the try-on items corresponding to the selected first fashion item;

determine a shape of the selected first fashion item is different from a shape of a try-on item of the try-on items; and correct, based on the determination that the shape of the selected first fashion item is different from the shape of the try-on item, the shape of the selected first fashion item to conform with the shape of the try-on item.

2. The first information processing device according to claim 1, wherein the CPU is further configured to control display of an image of the selected first fashion item suggested to the first user.

3. The first information processing device according to claim 1, wherein the CPU is further configured to control a first display device inside a moving object to display the try-on images.

4. The first information processing device according to claim 3, wherein the CPU is further configured to control a second display device outside of the moving object to display images of the selected first fashion item suggested to the first user.

5. The first information processing device according to claim 3, wherein the CPU is further configured to control a second display device outside of the moving object to display the try-on images.

6. The first information processing device according to claim 1, wherein the displayed try-on images further include second images in which a second fashion item coordinated with the selected first fashion item is superimposed on the first user.

7. The first information processing device according to claim 1, wherein the displayed try-on images further include an arrangement of a plurality of images of the first user on which different fashion items are superimposed.

8. The first information processing device according to claim 1, wherein the displayed try-on images further include an image of a second user on which a second fashion item coordinated with the selected first fashion item of the first user is superimposed.

9. The first information processing device according to claim 1, wherein the CPU is further configured to control the display of the try-on images on which backgrounds associated with the selected first fashion item are further superimposed.

10. The first information processing device according to claim 1, wherein, in the try-on images, images of the selected first fashion item are superimposed on images of the try-on items.

11. The first information processing device according to claim 1, wherein the try-on images further include images of the first user obtained in a state in which an image of the selected first fashion item is projected to the try-on items.

12. The first information processing device according to claim 11, wherein the CPU is further configured to control the projection of the image of the selected first fashion item to the try-on items.

13. The first information processing device according to claim 12, wherein the control of the projection is such that the image of the selected first fashion item is projected on an entirety of the try-on items.

14. The first information processing device according to claim 1, wherein the CPU is further configured to generate the try-on images.

15. The first information processing device according to claim 14, wherein
the CPU is further configured to superimpose an image of the selected first fashion item on an image of the try-on item of the try-on items, and
the image of the selected first fashion item corresponds to a mark attached to the try-on item.

16. The first information processing device according to claim 1, wherein the CPU is further configured to control transmission of the try-on images to a second information processing device.

17. The first information processing device according to claim 1, wherein the CPU is further configured to:
detect a response of the first user to at least one of a try-on image of the try-on images or the try-on item of the try-on items; and
generate observation data indicating the response.

18. The first information processing device according to claim 17, wherein the CPU is further configured to learn a preference of the first user based on the generated observation data.

19. The first information processing device according to claim 1, wherein the try-on items are colorless and plain.

20. The first information processing device according to claim 1, wherein
the selected first fashion item is clothing, and
the try-on items are try-on clothing.

21. An information processing method, comprising:
in an information processing device:
selecting a fashion item to be suggested to a user, wherein the selection of the fashion item is based on a feature of an outer appearance of the user;
controlling suggestion of try-on items corresponding to the selected fashion item to the user;
controlling display of try-on images including images in which the selected fashion item is superimposed on the user, wherein the displayed try-on images indicate trial of the try-on items corresponding to the selected fashion item;
determining a shape of the selected fashion item is different from a shape of a try-on item of the try-on items; and
correcting, based on the determination that the shape of the selected fashion item is different from the shape of the try-on item, the shape of the selected fashion item to conform with the shape of the try-on item.

22. A non-transitory computer-readable medium having stored thereon computer-executable instructions that, when executed by an information processing device, causes the information processing device to execute operations, the operations comprising:
selecting a fashion item to be suggested to a user, wherein the selection of the fashion item is selected based on a feature of an outer appearance of the user;
controlling suggestion of try-on items corresponding to the selected first fashion item to the user;
controlling display of try-on images including images in which the selected first fashion item is superimposed on the user, wherein the displayed try-on images indicate trial of the try-on items corresponding to the selected fashion item;
determining a shape of the selected fashion item is different from a shape of a try-on item of the try-on items; and correcting, based on the determination that the shape of the selected fashion item is different from the shape of the try-on item, the shape of the selected fashion item to conform with the shape of the try-on item.

\* \* \* \* \*